(12) United States Patent
Wagner et al.

(10) Patent No.: US 12,157,634 B2
(45) Date of Patent: Dec. 3, 2024

(54) SYSTEMS AND METHODS FOR LEARNING TO EXTRAPOLATE OPTIMAL OBJECT ROUTING AND HANDLING PARAMETERS

(71) Applicant: Berkshire Grey Operating Company, Inc., Bedford, MA (US)

(72) Inventors: Thomas Wagner, Concord, MA (US); Matthew T. Mason, Pittsburgh, PA (US); Thomas Koletschka, Cambridge, MA (US); Abraham Schneider, Andover, MA (US); Shervin Javdani, Pittsburgh, PA (US); Christopher Geyer, Arlington, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 162 days.

(21) Appl. No.: 17/836,271

(22) Filed: Jun. 9, 2022

(65) Prior Publication Data

US 2022/0297940 A1 Sep. 22, 2022

Related U.S. Application Data

(63) Continuation of application No. 16/664,196, filed on Oct. 25, 2019, now Pat. No. 11,407,589.

(Continued)

(51) Int. Cl.
*G06F 7/00* (2006.01)
*B65G 1/137* (2006.01)
(Continued)

(52) U.S. Cl.
CPC ......... *B65G 1/1371* (2013.01); *B65G 1/1373* (2013.01); *B65G 61/00* (2013.01); *G06Q 10/087* (2013.01)

(58) Field of Classification Search
CPC .... B65G 1/1371; B65G 1/1373; B65G 61/00; G06Q 10/087; B25J 9/1697;
(Continued)

(56) References Cited

U.S. PATENT DOCUMENTS 6,060,677 A 5/2000 Ulrichsen et al.
6,076,023 A 6/2000 Sato
(Continued)

FOREIGN PATENT DOCUMENTS

CA 2809253 A1 9/2014
CA 3117600 A1 4/2020
(Continued)

OTHER PUBLICATIONS

Communication pursuant to Rules 161(1) and 162 EPC issued by the European Patent Office in related European Application No. 19805016.3 on Jun. 1, 2021, 3 pages.

(Continued)

*Primary Examiner* — Yolanda R Cumbess
(74) *Attorney, Agent, or Firm* — Gesmer Updegrove LLP

(57) ABSTRACT

A system for object processing is disclosed. The system includes a framework of processes that enable reliable deployment of artificial intelligence-based policies in a warehouse setting to improve the speed, reliability, and accuracy of the system. The system harnesses a vast number of picks to provide data points to machine learning techniques. These machine learning techniques use the data to refine or reinforce in-use policies to optimize the speed and successful transfer of objects within the system. For example, objects in the system are identified at a supply location, a predetermined set of information regarding object is retrieved and combined with a set of object information and processing parameters determined by the system. The combined information is then used to determine (Continued)

routing of the object according to an initial policy. This policy is then observed, altered, tested, and re-implemented in an altered form.

38 Claims, 24 Drawing Sheets

Related U.S. Application Data

(60) Provisional application No. 62/865,421, filed on Jun. 24, 2019, provisional application No. 62/750,777, filed on Oct. 25, 2018.

(51) Int. Cl.
  *B65G 61/00* (2006.01)
  *G06Q 10/087* (2023.01)

(58) Field of Classification Search
  CPC ........... G05B 2219/39298; G05B 2219/40053; G05B 2219/45063; G05B 19/41
  USPC .................................. 700/213, 215, 223–225
  See application file for complete search history.

(56) References Cited

U.S. PATENT DOCUMENTS

| | | |
|---|---|---|
| 6,079,570 A | 6/2000 | Oppliger et al. |
| 6,124,560 A | 9/2000 | Roos et al. |
| 6,131,372 A | 10/2000 | Pruett |
| 6,208,908 B1 | 3/2001 | Boyd et al. |
| 6,401,936 B1 | 6/2002 | Isaacs et al. |
| 6,579,053 B1 | 6/2003 | Grams et al. |
| 6,685,031 B2 | 2/2004 | Takizawa |
| 6,688,459 B1 | 2/2004 | Bonham et al. |
| 6,721,444 B1 | 4/2004 | Gu et al. |
| 7,516,848 B1 | 4/2009 | Shakes et al. |
| 7,728,244 B2 | 6/2010 | De Leo et al. |
| 8,201,737 B1* | 6/2012 | Palacios Durazo .. G06Q 10/087 235/383 |
| 8,560,406 B1 | 10/2013 | Antony |
| 8,662,314 B2 | 3/2014 | Jones et al. |
| 8,718,814 B1 | 5/2014 | Clark et al. |
| 8,798,784 B1 | 8/2014 | Clark et al. |
| 8,952,284 B1 | 2/2015 | Wong et al. |
| 9,227,323 B1 | 1/2016 | Konolige et al. |
| 9,364,865 B2 | 6/2016 | Kim |
| 9,486,926 B2 | 11/2016 | Kawano |
| 9,492,923 B2 | 11/2016 | Wellman et al. |
| 9,604,363 B2 | 3/2017 | Ban |
| 9,694,977 B2 | 7/2017 | Aprea et al. |
| 9,751,693 B1 | 9/2017 | Battles et al. |
| 9,821,464 B2 | 11/2017 | Stiernagle et al. |
| 9,878,349 B2 | 1/2018 | Crest et al. |
| 9,926,138 B1 | 3/2018 | Brazeau et al. |
| 9,937,532 B2 | 4/2018 | Wagner et al. |
| 9,962,743 B2 | 5/2018 | Bombaugh et al. |
| 9,975,148 B2 | 5/2018 | Zhu et al. |
| 10,007,827 B2 | 6/2018 | Wagner et al. |
| 10,058,896 B2 | 8/2018 | Hicham et al. |
| 10,335,956 B2 | 7/2019 | Wagner et al. |
| 10,438,034 B2 | 10/2019 | Wagner et al. |
| 10,538,394 B2 | 1/2020 | Wagner et al. |
| 10,576,621 B2 | 3/2020 | Wagner et al. |
| 10,611,021 B2 | 4/2020 | Wagner et al. |
| 10,810,715 B2 | 10/2020 | Chamberlin |
| 10,843,333 B2 | 11/2020 | Wagner et al. |
| 10,853,757 B1 | 12/2020 | Hill et al. |
| 10,919,151 B1* | 2/2021 | Marchese ............ B65G 1/1373 |
| 11,055,504 B2 | 6/2021 | Wagner et al. |
| 2002/0092801 A1 | 7/2002 | Dominguez |
| 2002/0170850 A1 | 11/2002 | Bonham et al. |
| 2002/0179502 A1 | 12/2002 | Cerutti et al. |
| 2003/0029946 A1 | 2/2003 | Lieber et al. |
| 2003/0034281 A1 | 2/2003 | Kumar |
| 2003/0038065 A1 | 2/2003 | Pippin et al. |
| 2004/0065597 A1 | 4/2004 | Hanson |
| 2004/0112712 A1 | 6/2004 | Brooks et al. |
| 2005/0167343 A1 | 8/2005 | Avishay |
| 2006/0190356 A1 | 8/2006 | Nemet |
| 2007/0209976 A1 | 9/2007 | Worth et al. |
| 2008/0046116 A1 | 2/2008 | Khan et al. |
| 2008/0181485 A1 | 7/2008 | Beis et al. |
| 2010/0122942 A1 | 5/2010 | Harres et al. |
| 2010/0260380 A1 | 10/2010 | Kaeser et al. |
| 2011/0320036 A1 | 12/2011 | Freudelsperger |
| 2013/0110280 A1 | 5/2013 | Folk |
| 2013/0218335 A1 | 8/2013 | Barajas et al. |
| 2013/0235372 A1 | 9/2013 | Voss |
| 2014/0061103 A1 | 3/2014 | Ito et al. |
| 2014/0244026 A1 | 8/2014 | Neiser |
| 2015/0032252 A1 | 1/2015 | Galluzzo et al. |
| 2015/0057793 A1 | 2/2015 | Kawano |
| 2015/0073589 A1 | 3/2015 | Khodl et al. |
| 2015/0081090 A1 | 3/2015 | Dong |
| 2015/0306634 A1 | 10/2015 | Maeda et al. |
| 2016/0075521 A1 | 3/2016 | Puchwein et al. |
| 2016/0132787 A1 | 5/2016 | Drevo et al. |
| 2016/0136816 A1 | 5/2016 | Pistorino |
| 2016/0221766 A1 | 8/2016 | Schroader et al. |
| 2016/0228921 A1 | 8/2016 | Doublet et al. |
| 2016/0260161 A1 | 9/2016 | Atchley et al. |
| 2016/0379076 A1 | 12/2016 | Nobuoka et al. |
| 2017/0024896 A1 | 1/2017 | Houghton et al. |
| 2017/0076251 A1 | 3/2017 | Simske et al. |
| 2017/0121113 A1 | 5/2017 | Wagner et al. |
| 2017/0128986 A1 | 5/2017 | Sterkel |
| 2017/0136632 A1 | 5/2017 | Wagner et al. |
| 2017/0157648 A1 | 6/2017 | Wagner et al. |
| 2017/0157649 A1 | 6/2017 | Wagner et al. |
| 2017/0173638 A1 | 6/2017 | Wagner et al. |
| 2017/0197233 A1 | 7/2017 | Bombaugh et al. |
| 2017/0210572 A1 | 7/2017 | Alberti et al. |
| 2017/0213156 A1 | 7/2017 | Hammond et al. |
| 2017/0312789 A1 | 11/2017 | Schroader |
| 2017/0323253 A1 | 11/2017 | Enssle et al. |
| 2017/0330135 A1 | 11/2017 | Taylor et al. |
| 2017/0349615 A1 | 12/2017 | Moroni et al. |
| 2018/0056333 A1 | 3/2018 | Hicham et al. |
| 2018/0105363 A1 | 4/2018 | Lisso et al. |
| 2018/0127219 A1 | 5/2018 | Wagner et al. |
| 2018/0148272 A1 | 5/2018 | Wagner et al. |
| 2018/0154399 A1 | 6/2018 | Wagner et al. |
| 2018/0265291 A1 | 9/2018 | Wagner et al. |
| 2018/0265298 A1 | 9/2018 | Wagner et al. |
| 2018/0265311 A1 | 9/2018 | Wagner et al. |
| 2018/0273295 A1 | 9/2018 | Wagner et al. |
| 2018/0273296 A1 | 9/2018 | Wagner et al. |
| 2018/0273297 A1 | 9/2018 | Wagner et al. |
| 2018/0273298 A1 | 9/2018 | Wagner et al. |
| 2018/0282065 A1 | 10/2018 | Wagner et al. |
| 2018/0282066 A1 | 10/2018 | Wagner et al. |
| 2018/0312336 A1 | 11/2018 | Wagner et al. |
| 2018/0327198 A1 | 11/2018 | Wagner et al. |
| 2018/0330134 A1 | 11/2018 | Wagner et al. |
| 2018/0333749 A1 | 11/2018 | Wagner et al. |
| 2019/0091730 A1 | 3/2019 | Torang |
| 2019/0099784 A1 | 4/2019 | Moriyama et al. |
| 2019/0100368 A1 | 4/2019 | Zagar et al. |
| 2019/0127147 A1 | 5/2019 | Wagner et al. |
| 2019/0217471 A1 | 7/2019 | Romano et al. |
| 2019/0270197 A1 | 9/2019 | Wagner et al. |
| 2019/0337723 A1 | 11/2019 | Wagner et al. |
| 2020/0005005 A1 | 1/2020 | Wagner et al. |
| 2020/0023410 A1 | 1/2020 | Tamura et al. |
| 2020/0065747 A1 | 2/2020 | Elazary et al. |
| 2020/0126025 A1 | 4/2020 | Kumar et al. |
| 2020/0130935 A1 | 4/2020 | Wagner et al. |
| 2020/0130951 A1 | 4/2020 | Wagner et al. |
| 2020/0143127 A1 | 5/2020 | Wagner et al. |
| 2020/0151407 A1 | 5/2020 | Wagner et al. |
| 2020/0151408 A1 | 5/2020 | Wagner et al. |
| 2020/0151409 A1 | 5/2020 | Wagner et al. |
| 2020/0151410 A1 | 5/2020 | Wagner et al. |

(56) References Cited

U.S. PATENT DOCUMENTS

| | | |
|---|---|---|
| 2020/0160011 A1 | 5/2020 | Wagner et al. |
| 2020/0164517 A1 | 5/2020 | Dick et al. |
| 2020/0319627 A1 | 10/2020 | Edwards et al. |
| 2021/0039140 A1 | 2/2021 | Geyer et al. |
| 2021/0122053 A1 | 4/2021 | Hallock et al. |
| 2021/0276796 A1 | 9/2021 | Long |
| 2021/0276797 A1 | 9/2021 | Velagapudi et al. |
| 2021/0276798 A1 | 9/2021 | Velagapudi et al. |
| 2022/0245583 A1 | 8/2022 | Hinjosa et al. |
| 2022/0315358 A1 | 10/2022 | Ryan et al. |
| 2023/0133964 A1 | 5/2023 | Gravelle et al. |
| 2023/0321694 A1 | 10/2023 | Hedge et al. |
| 2023/0331416 A1 | 10/2023 | Matl et al. |

FOREIGN PATENT DOCUMENTS

| | | | |
|---|---|---|---|
| CN | 1033604 A | 7/1989 | |
| CN | 101808916 A | 8/2010 | |
| CN | 101971221 A | 2/2011 | |
| CN | 203955558 U | 11/2014 | |
| CN | 204724475 U | 10/2015 | |
| CN | 105631697 A | 6/2016 | |
| CN | 106327116 A | 1/2017 | |
| CN | 106662437 A | 5/2017 | |
| CN | 107861974 A | 3/2018 | |
| CN | 108349083 B | 7/2018 | |
| CN | 108351637 A | 7/2018 | |
| CN | 112930547 A | 6/2021 | |
| DE | 102006057658 A1 | 6/2008 | |
| DE | 102007023909 A1 | 11/2008 | |
| EP | 0648695 A2 | 4/1995 | |
| EP | 1695927 A2 | 8/2006 | |
| EP | 1995192 A2 | 11/2008 | |
| EP | 2477914 B1 | 4/2013 | |
| EP | 3854535 A1 * | 7/2021 | ……… B25J 15/0616 |
| GB | 2356383 A | 5/2001 | |
| GB | 2507707 A | 5/2014 | |
| JP | 05324662 A | 12/1993 | |
| JP | 2002028577 A | 1/2002 | |
| JP | 2008037567 A | 2/2008 | |
| WO | 03074201 A1 | 9/2003 | |
| WO | 2008089150 A2 | 7/2008 | |
| WO | 2009021650 A1 | 2/2009 | |
| WO | 2010099873 A1 | 9/2010 | |
| WO | 2011038442 A2 | 4/2011 | |
| WO | 2012024714 A2 | 3/2012 | |
| WO | 2012127102 A1 | 9/2012 | |
| WO | 2014130937 A1 | 8/2014 | |
| WO | 2014166650 A1 | 10/2014 | |
| WO | 2015035300 A1 | 3/2015 | |
| WO | 2015118171 A1 | 8/2015 | |
| WO | 2017044747 A1 | 3/2017 | |
| WO | 2017163713 A1 | 9/2017 | |
| WO | WO-2018146687 A1 * | 8/2018 | ………… B25J 13/02 |
| WO | 2020086995 A1 | 4/2020 | |
| WO | 2021026359 A1 | 2/2021 | |

OTHER PUBLICATIONS

Examiner's Report issued by the Innovation, Science and Economic Development Canada (Canadian Intellectual Property Office) in related Canadian Patent Application No. 3,117,600 on May 9, 2022, 4 pages.

International Preliminary Report on Patentability issued by the International Bureau of WIPO in International Application No. PCT/US2019/058132 on Apr. 27, 2021, 8 pages.

International Search Report and Written Opinion of the International Searching Authority issued on Jan. 15, 2020 in related International Application No. PCT/US2019/058132, 12 pages.

Non-Final Office Action issued by the United States Patent and Trademark Office in related U.S. Appl. No. 16/664,196 on Sep. 14, 2021, 15 pages.

Notice on the First Office Action, along with its English translation, issued by the China National Intellectual Property Administration in related Chinese Patent Application No. 201980070907.6 on Nov. 2, 2023, 28 pages.

Examiner's Report issued by the Innovation, Science and Economic Development Canada (Canadian Intellectual Property Office) in related Canadian Patent Application No. 3,117,600 on May 11, 2023, 6 pages.

Communication pursuant to Article 94(3) EPC issued by the European Patent Office in related European Patent Application No. 198050163 on Apr. 19, 2024, 6 pages.

Notice on the Second Office Action, along with its English translation, issued by the China National Intellectual Property Administration in related Chinese Patent Application No. 201980070907.6 on May 22, 2024, 20 pages.

* cited by examiner

SYSTEMS AND METHODS FOR LEARNING TO EXTRAPOLATE OPTIMAL OBJECT ROUTING AND HANDLING PARAMETERS

PRIORITY

The present application is a continuation of U.S. patent application Ser. No. 16/664,196, filed Oct. 25, 2019, now U.S. Pat. No. 11,407,589, issued Aug. 9, 2022, which claims priority to U.S. Provisional Patent Application Ser. No. 62/750,777, filed Oct. 25, 2018, as well as to U.S. Provisional Patent Application Ser. No. 62/865,421, filed Jun. 24, 2019, the disclosures of which are hereby incorporated by reference in their entireties.

BACKGROUND

The invention generally relates to object processing systems, and relates in particular to object processing systems such as automated storage and retrieval systems, distribution center systems, and sortation systems that are used for processing a variety of objects.

Automated storage and retrieval systems (AS/RS), for example, generally include computer controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional object processing systems in terms of the time and resources required to move totes toward and then away from each person, as well as how quickly a person can process totes in this fashion in applications where each person may be required to process a large number of totes. There remains a need therefore, for an object processing system that stores and retrieves objects more efficiently and cost effectively, yet also assists in the processing of a wide variety of objects.

SUMMARY

In accordance with an embodiment the invention provides a system for object processing. The system includes a supply location having one or more objects to be processed, a plurality of object processing stations for processing objects, an object classification system, and a routing system. The object classification system includes an identification system for identifying an object at the supply location, a first data repository having a first set of object information, and a second data repository having a second set of object information, the second set of object information including processing parameters. The first set of object information is supplied with the object and the second set of object information is determined by the system, and the object classification system assigns the object to a class based on the first set of information and the second set of information. The routing system is for routing an object from the supply location to a selected object processing station capable of processing objects in the assigned class, wherein the selected object processing station processes the object according to the determined processing parameters.

In accordance with another embodiment the invention provides a method of processing objects. The method includes the steps of: presenting an object to a routing station, evaluating provided object information and determining object information associated with the object, wherein the determined object information includes processing parameters, classifying the object based on provided and determined object information, selecting a picking station to process the object based on object classification, routing the object from the routing station to the selected picking station, processing the object at the picking station according to said processing parameters, observing the object being processed at the processing station, scoring the object handling performance based on observed criteria, and updating the processing parameters based on object handling performance score.

In accordance with a further embodiment the invention provides a method of processing objects. The method includes the steps of: providing, at a supply location, one or more objects to be processed, providing an object classification system, wherein the object classification system includes: an identification system for identifying an object at the supply location, a first data repository having a first set of object information, and a second data repository having a second set of object information, said second set of object information including feature information regarding a plurality of objects, The method also includes the steps of providing the first set of object information with the object, providing the second set of object information via a feedback learning system, wherein the second set of object information includes feature information regarding object features, assigning the object to a class based on the first set of information and the second set of information, and updating the second set of object information following engagement with the object.

In accordance with yet a further embodiment the invention provides a method of processing objects. The method includes the steps of: providing, at a supply location, one or more objects to be processed, capturing identification data for the object, querying a first data repository having a first set of object information, determining that the identification data for the object is not included within the first set of object information, identifying object feature data regarding the object, querying a second data repository having a second set of object information, said second set of object information including feature information regarding a plurality of objects, identifying associated object information within the second set of object information, said associated object information including learned feature data that closely matches the object feature data, said learned feature data being associated with a related object, and engaging with a programmable motion device, the object using grasp and acquisition data regarding the related object.

BRIEF DESCRIPTION OF THE DRAWINGS

The following description may be further understood with reference to the accompanying drawings in which.

Figure 1:
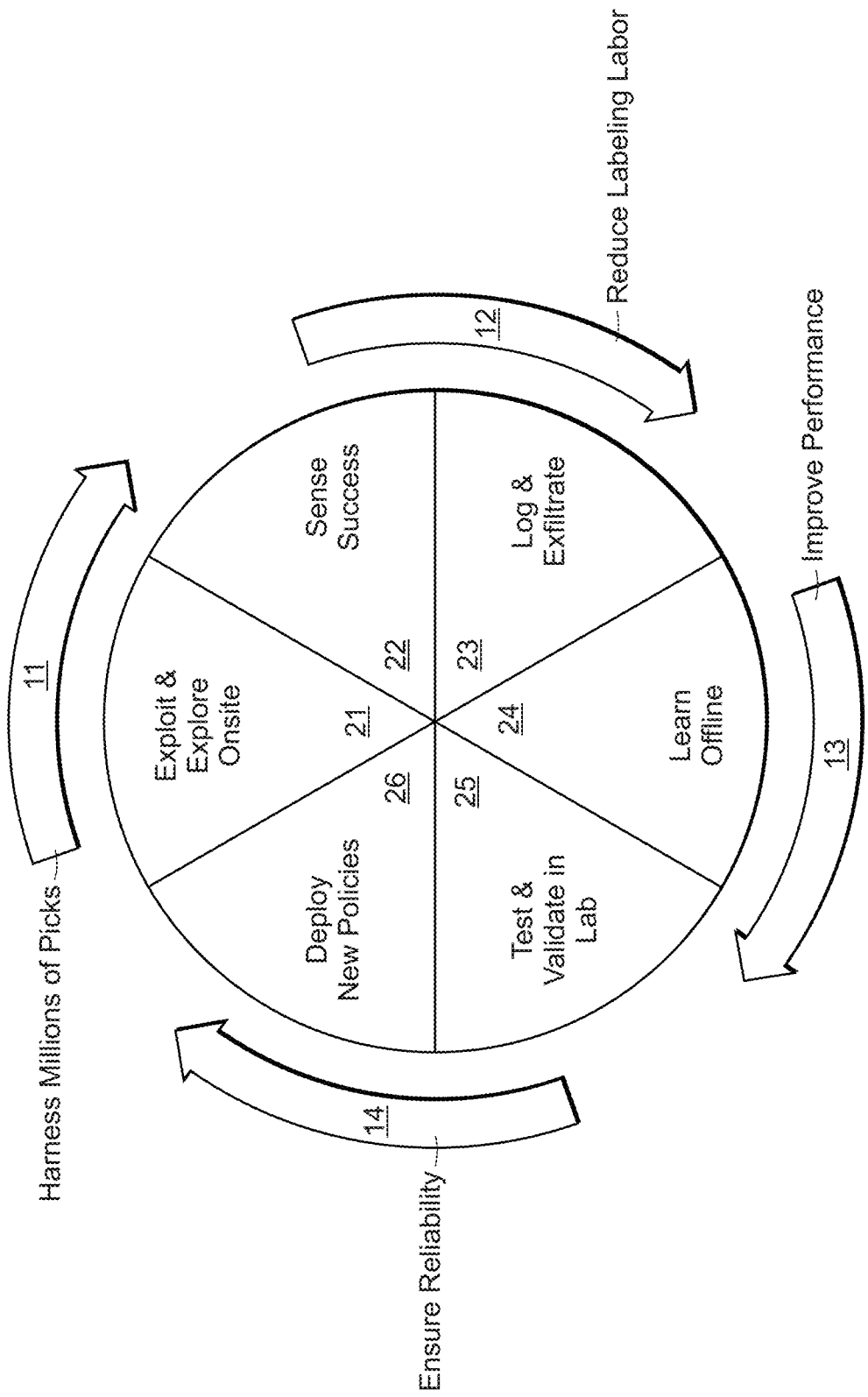
FIG. 1 shows an illustrative diagrammatic view of a framework for use in an object processing system in accordance with an embodiment of the present invention.

The drawings are shown for illustrative purposes only.

DETAILED DESCRIPTION

An unstructured and dynamic physical environment such as an order fulfillment center presents unique challenges to operators. A nearly endless variety of goods needs to be identified, picked up, and routed. Human workers set a high bar for recognizing attributes and similarities between objects they encounter. In order for robots to be as fast as or faster than a human, artificial intelligence (AI), and machine learning in particular, are required to improve system performance in the face of operational complexity.

In accordance with an embodiment, the invention provides an automated material handling system that is tasked, in part, with routing objects carried in bins to stations where objects are transferred from one bin to another with one or more programmable motion devices (such as articulated arms) at automated stations, and may further include manual stations. The bins may be containers, totes, or boxes etc. An overall objective of the system may be to sort and ship goods, to perform order fulfillment, to replenish store stock, or to provide any general-purpose system requiring the transfer of individual objects from one bin to another.

The objects may be packages, boxes, flats or polybags etc. in a shipping center, or consumer products in an e-commerce order fulfillment center, or products and warehouse packs in a retail distribution center (DC). The bins might be bins from an automatic storage and retrieval system (AS/RS), vendor cases, store replenishment boxes, or any other containing mechanism designed to hold items separate from one another. The conveyance of bins could take many forms, including belt or roller conveyors, chutes, mobile robots, or human workers. The picking stations, where items are transferred, might be automated systems including programmable motion devices, such as articulated arm robotic systems.

The automated material handling system employs a policy that executes an algorithm or process to determine how to route bins to picking stations. One such algorithm might be to balance the load so that all picking stations are utilized and none are idle. In some cases, however, uniquely configured picking stations may be employed throughout the system that have different capabilities for processing different object types. For example, pick station A may be worse at picking item X, than is pick station B, and therefore it is better to send item X to pick station B. In this case, another algorithm can be employed to route objects through the system, taking into account the strengths and weaknesses of various pick stations. Furthermore, it may be that robotic pick station A has pick modes 1 and 2, and that mode 2 is better at picking item X. In accordance with various embodiments, the invention provides a system incorporating a set of processes for learning how to optimize both a routing to pick stations and parameters pertinent to pick station operation, so as to increase the performance of the overall operation. The optimization chooses routing and handling parameters that enhance the expected overall performance of picking according to various kinds of criteria, including throughput and accuracy, conditioned on the contents of the bins.

Learning, in the sense of improving over time, is a key aspect of systems of embodiments of the invention. The system provides the performance of picking as a function of item, pick station and handling parameters. Further, objects that have not yet been picked will periodically be encountered. It is likely, however, that new objects that are similar to previously picked items, will have similar performance characteristics. For example, object X may be a kind of shampoo in a 20 ounce bottle, and object Y may be conditioner in a 20 ounce bottle. If distributed by the same company, then the shape of the bottles may be the same. Accordingly, handling of the bottles would likely be the same or very similar. Systems of embodiments of the invention include processes that use observations of past performance on similar items to predict future performance, and learn what characteristics of the items available to the system are reliable predictors of future performance.

Every pick is a new data point. There are many variables throughout the picking process that can be altered to provide new data points. For example, the system can change the speed of robot arm motions, the location on an object where it is picked, the gripper type used, the gripping force applied, etc. The principal outcome examined is whether the object was successfully moved from its source location to a desired destination.

FIG. 1 illustrates a framework of this invention that effectuates reliable deployment of AI-based solutions and enables the system to harness millions of picks that provide more power to machine learning techniques. Because of uncertainty about the best action or policy, multiple policies are employed to test speed, reliability, and accuracy.

Specifically, FIG. 1 shows various stages of a cyclical, iterative process for operational testing and refinement. In one embodiment, the cycle is broken down into six phases that define distinct phases of a machine learning and implementation process. These six phases make up main features of the cyclical process. One main feature 11 of the cycle harnesses millions of picks in a warehouse setting to provide real-world data to the system. The next feature 12 highlights the reduction of labeling labor required in assessing the performance of the system. The next feature 13 seeks to improve the performance of the system using the data collected. And the final feature 14 seeks to ensure reliability of new policies before introducing them back into the commercial warehouse setting.

The top phase of the cycle begins with phase 21 that provides general data collection within a warehouse or order fulfillment center. The system uses previously successful arrangements to process objects and collects data about these arrangements to improve the model. At this stage, safe and gradual alterations to the arrangements are made that compound over millions of picks. In some embodiments, the altered arrangements make up a very small percentage, e.g. less than one percent, of total picks, to provide reliability in the system.

Phase 22 also takes place in the warehouse, and uses a multitude of sensors to determine, broadly, whether each pick has been successful or not. The sensors also provide detailed information about various sensed attributes throughout processing. This continued monitoring allows the system to adjust certain attributes to improve outcomes, or to generally correct mistakes. This automated sensing relieves a worker from having to manually identify and label a utilized arrangement as a success or failure. The system can operate more reliably, missing fewer instances of failure than a human worker in most cases, as well as providing more and nearly instantaneous data reporting about a success or failure.

Phase 23 represents the act of getting the collected data out of the warehouse. Collected data can include sensed data, as well as order data or other data to provide a complete context to each pick that can be broken down and analyzed. This data transfer out of the warehouse can be compressed and sub-sampled to reduce network impact.

Phase 24 occurs offline and offsite, using the logged data, including context and outcome pairs, to learn policies to control the various operational variables used. For example, in some embodiments, policies for grasp location, and robot actions and behaviors such as arm speeds and trajectories can be developed, or previously used policies can be reinforced, based on discovered patterns in the data. This can lead to associations between SKUs that indicate potentially successful policies for a newer object for which the system has less or no information.

Phase 25 tests and validates new policies before they are introduced to the warehouse. The new policies can be tested using real systems and typically encountered objects, or can be tested using simulations of real world processing. By isolating the testing and validation, operational risk is isolated from the warehouse. Mistakes made offline outside of the warehouse do not impact actual order fulfillment, for example. During this exploratory phase, millions of situations are practiced or simulated both to improve policy performance and to ensure appropriate behavior of learned behaviors.

Phase 26 orchestrates the deployment of new policies to warehouses to act as the primary operational policies during processing. The deployment occurs as a gradual roll-out of the learned policies to the sites. In some embodiments, the roll-out is provided only to certain areas within the warehouse, or to certain warehouses if multiple warehouses are to be affected by the new policies in order to provide another layer of reliability in the new policies. Once the roll-out is complete (whether partially or fully), the cycle returns once again to the top phase 10, continuing the cycle.

In accordance with certain embodiments, systems of the invention provide certain information that is determined to be absolutely correct, or ground truth (GT) information, regarding a variety of parameters through such feedback learning. For example, weight sensors may be used to determine or confirm a multi-object pick occurrence as follows. The weight sensors may be used to determine that more than one object has been grasped, for example, if an item is identified yet the experienced weight is much greater than that of the identified object. If such a grasp is maintained (even for a short period) the system will note any or all of: the air flow at the end effector, the change in air flow at the end effector, the vacuum level during grasp at the end effector, the change in vacuum during grasp at the end effector, the change in any of weight, linear acceleration, angular acceleration, or rotation. Such noted changes (or events of not having changed) will then be correlated with performance (a successful grasp and acquisition, or a not successful grasp and acquisition), and may be further detailed with regard to whether such gasps repeated over time are generally successful and/or whether the movement (acquisition) repeated over time is generally successful. The use of such sensing may permit the system to determine ground truths (GT) with respect to a specific object, stock keeping unit (SKU), or other set of known information. For example, if an object with a known SKU is grasped, and the system then detects that any of change in vacuum during grasp at the end effector, the change in any of weight, linear acceleration, angular acceleration, or rotation is recorded that is associated with a multi-pick, the system will know (GT) that the acquired object is a multi-pick and needs to be processed not as the identified SKU or other known information may dictate, but rather as a multi-pick that needs to be either re-processed or processed by human personnel. The sooner the system knows that a pick violated GT, the sooner the system may re-process or post-process the multi-pick. If a weight of an object is not known, but the object is identified by a SKU, the system may record the weight load when the object is engaged by an end effector, and then note the weight load on the end effector again after the object is dropped. Further, weight scales (such as weight sensing carriages) may be used. Within a short time, the known weight (ground truth weight) of the object will be recorded with certainty for that SKU.

In accordance with further embodiments, the system provides a learning process that (a) extrapolates the performance of newly seen objects, and (b) is continually updating the data with which it learns to extrapolate so as to continually improve performance. The potential pick parameters are diverse. Several controllable pick parameters may govern the process, such as, which picking stations can pick a given item, which effectors (vacuum cup size or gripper type) are effective for that item, what rules might be used to choose locations on an item to grasp etc. Because these process parameters can change on a per-SKU basis, and will determine the efficacy and speed of a picking station and further may be determined on a per-SKU basis, it is necessary to estimate these parameters correctly. In particular, the correct values of process parameters depend on the nature of the item, its weight and size, its packaging, its material properties such as whether it is deformable or clear, whether vacuum grippers are effective at holding it, where good grasp locations are on the object, and whether it is easily damaged.

In many operating conditions however, this can be challenging, as new SKUs may be present, which means that there is no known set of parameters available. While these parameters will be learned from repeated interactions with the object, this can slow down handling time considerably. To speed up the time it takes to learn the appropriate parameters, using previously recorded data based on similar SKUs can be useful. In accordance with certain embodiments, systems of the invention may employ 3-D modelling of objects, and train on generated data, for example, by seeking to associate 3-D models with data regarding known objects.

In accordance with further embodiments, system of the invention may direct correlating information not on SKUs but on packaging. In such systems, a generalization or description of a packaging (e.g., shape, size, weight, length, width, height, circumference or center or mass) may be provided as an association event, and the system may act in accordance with the closest association event parameters. For example, some package features such as known rectangular surface areas on common boxes, known shapes of indicia on common boxes, known contours of common objects, and known features of certain objects such as clam-shell cases, may be learned and be the subject of learned knowledge. Again, a performance of such actions is also recorded regarding whether the performance was successful (successful grasp and acquisition) or not successful (not a successful grasp or acquisition).

In accordance with various embodiments, the invention provides processes for an automated material handling system that routes bins to picking stations, and which provides the following. The system may predict object-specific parameters for new objects based on previously seen objects. For new objects similar to previously handled objects, the processes predict what are expected to be good routing and handling parameters. In this instance an object is readily recognized as being quite similar to objects with which the system has extensive experience. From the barcode or SKU number or product category or description text or from appearance or other features, the system might recognize the object and index information in the database, which might include process parameters, or will at least include information from which process parameters can be determined with high confidence.

Further, the system may explore the parameter space for completely unknown objects. For new objects that are not sufficiently similar to any previously handled objects, the system may propose multiple candidate routing and handling parameters with the aim of finding good routing and handling parameters. When an unfamiliar object is first introduced, process parameters must be determined.

The system may also update predictive models of object-specific handling performance from observed item handling performance. Processes refine the routing and handling parameters on an object basis, as experience with that object is gained. The predictive model is refined as experience is gained.

The system may further update predictive models of object-to-object similarity from observed object handling performance. The parameters affecting the schemes and processes for classifying and/or clustering objects are refined as experience with all available items is increased. Further, the system may recognize and correct for persistent discrepancies in actual versus predicted performance. Some objects, when replenished by the manufacturer, have different weights, packaging or other characteristics that impact the object's handling performance. Old routing and handling parameters that yielded good performance before may be inappropriate for the changed object. When the actual performance repeatedly exceeds the range of the predicted performance, the system favors exploration of the parameter space.

In accordance with various embodiments, a set of object information includes feature information regarding object features, and the feature information may be developed associated with any of object SKU, text description, product category, object manufacturer, object mass, object material, object shape, packaging details, object images, and object color. For example, the system may collect such feature information regarding an object as the object is grasped and acquired. The system may engage cameras and scanners to collect any text description, product category, object manufacturer, object mass, object material, object shape, packaging details, object images, and object color information, and associate the information with the SKU. Such collected information is associatively recorded (e.g., tabulated, networked, commonly connected or grouped etc.) and is therefore associated with each other and with the SKU. The system may further engage in machine learning in the processing of pixels of images from the cameras by learning at a pixel level how best to break apart images of objects, for example, in hierarchical representations.

In accordance with further embodiments, the feature information may be developed associated with any of sensed information, object weight, object material, object shape, object opacity, object size, object volume, effector to be used, grip location, object movement limitations, object fragility, and object processing limitations. Similarly, the system may collect such feature information regarding an object as the object is grasped and acquired. The system may engage sensors to collect any sensed information, object weight, object material, object shape, object opacity, object size, object volume, effector to be used, grip location, object movement limitations, object fragility, and object processing limitations, and associate the information with the SKU. Such collected information is associatively recorded (e.g., tabulated, networked, commonly connected or grouped etc.) and is therefore associated with each other and with the SKU. In any of these embodiments, the number of associations of any of the above factors may be used to identify a grasp location and action to be taken to provide a positive grasp and acquisition, and such further actions may be recorded for further machine learning.

In such embodiments of the invention, the machine learning systems may engage reward feedback such that when an item (identified as discussed above) is grasped and successfully transported, such an event is recorded as a successful performance, and all parameters regarding the entire action are recorded as being associated with each other. When an unknown object is later acquired, the system may for example, determine the number of commonalities of such text description, product category, object manufacturer, object mass, object material, object shape, packaging details, object images, and object color information, or sensed information, object weight, object material, object shape, object opacity, object size, object volume, effector to be used, grip location, object movement limitations, object fragility, and object processing limitations.

In accordance with further embodiments, associations of commonalities may be generated that achieve performance of the task (successfully moving an object) such that the collection of parameters are recorded as having achieved a positive performance. Through such a reward feedback process, a system may learn from actions that do not achieve positive performance, and learn from actions that do achieve positive performance.

Figure 2:
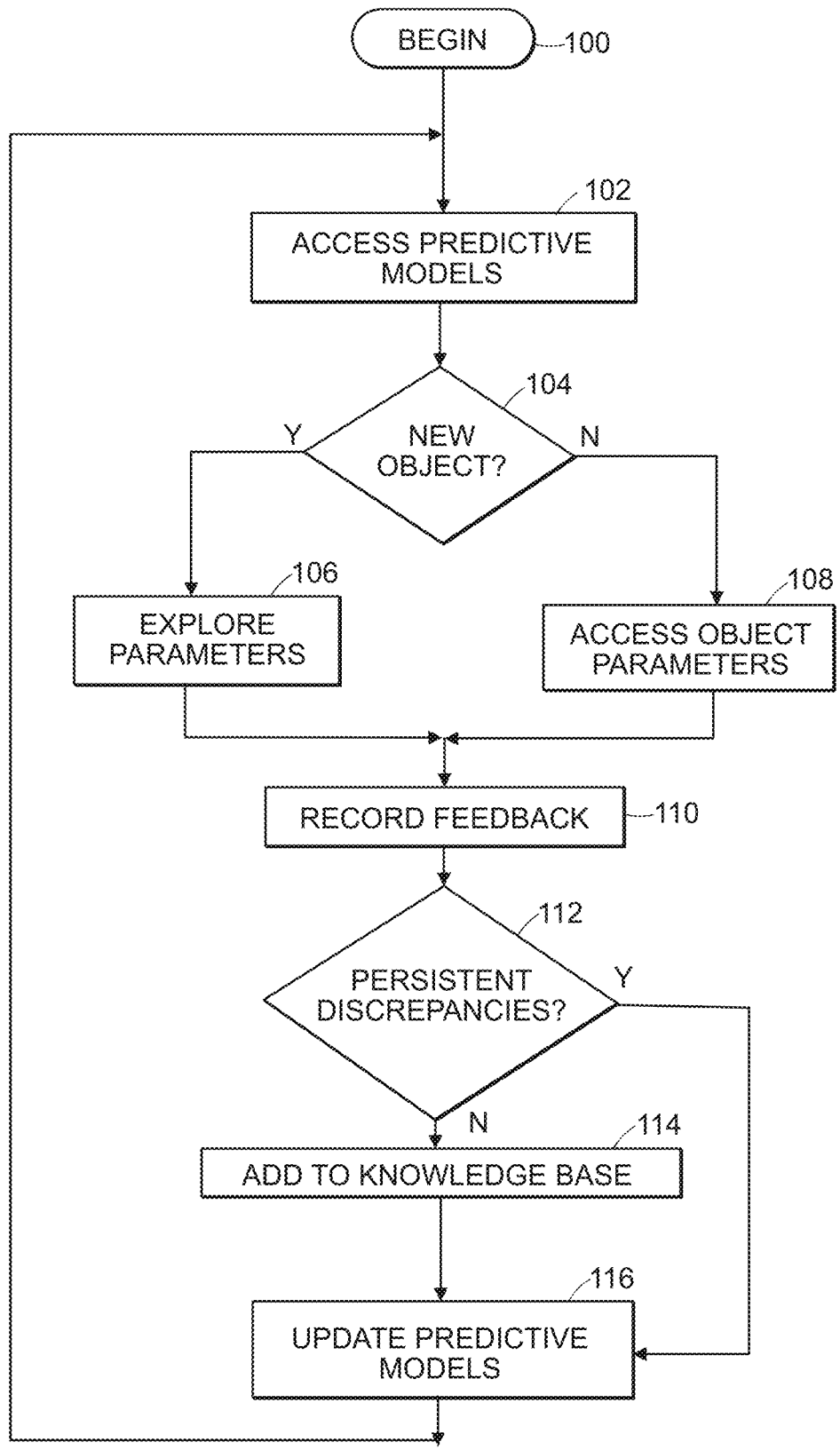
FIG. 2 shows an illustrative diagrammatic view of a process for use in an object processing system in accordance with an embodiment of the present invention.

FIG. 2, for example, shows an overall process in accordance with an embodiment of the present invention. The process begins (step 100) and the predictive models are accessed (step 102). The predictive models are previously compiled by any combination of data entry by human personnel or gained through experience of handling specific objects. When an object is encountered, the system first determines whether the object is new (step 104). If the object is new, the system may explore the parameter space for the object, for example, by trying different grasp locations and/or different routes. If the object is new but is similar in size, shape, or SKU etc. as discussed above, the system may process the object in accordance with the parameters for the similar object for which the system has processing parameters (step 108). If the object is not new, the system processes the object in accordance with object's processing parameters (also step 108). As discussed further below, the system records a substantial amount of data regarding both the object and its characteristics during processing, and records this information as feedback (step 110). The system may then determine whether there are persistent discrepancies with the processing parameters and the recorded feedback (step 112). If not, the feedback information is added to the knowledge base of processing parameters (step 114), and the predictive models are updated (step 116). If persistent discrepancies are identified with respect to the processing parameters, such information is added to the predictive models (step 116), for example, by either flagging as uncertain the model parameters, or replacing the model parameters with the recorded feedback information.

An object processing system in accordance with an embodiment, may provide a goods-to-robot product sorting system, in which bins are brought to a pick-and-place robot that must pick an object from one bin and place it into another. For example, each source bin may provide a homogeneous set of retail products, which was filled by an earlier process that decants vendor cases into bins. These bins might be conveyed directly to picking stations, stored in short-term buffer storage, or placed in an Automatic Storage and Retrieval System (AS/RS). As part of the decanting process, the product SKU is noted and a bin ID number is also noted, and the two numbers are associated in the facility management software database. The bins filled with items are sent back to the stores to replenish the store's stock of items. When a store order is processed, a set of source bins and a destination bin are routed to a picking station. The picking station could be automated with a robot, or it could be a manual picking station where a person does the handling.

There might be a variety of robot types for handling different item classes, or the robots might be capable of changing effectors, from one size vacuum cup to another, for example. The robots pick an object from the source bin, transport it to the destination bin, and drop or place the object therein. Following the operation, sensory information (including depth sensors, RGB cameras, flow sensors, pressure sensors, wrist-state, etc.) collected over the entire interaction is employed to determine whether the transfer operation was successful, and the type of failure when necessary, and this information is stored in the system database.

In addition to sensor information, manual feedback may be supplied by operators based on viewing the handling, where the operator, for example, selects a menu of items that could include "robot could move faster slower," or "it picked more than one item when it should have picked one," or "was the grasp point ok?" or "the item was damaged," or "the item was dropped too high."

Figure 3:
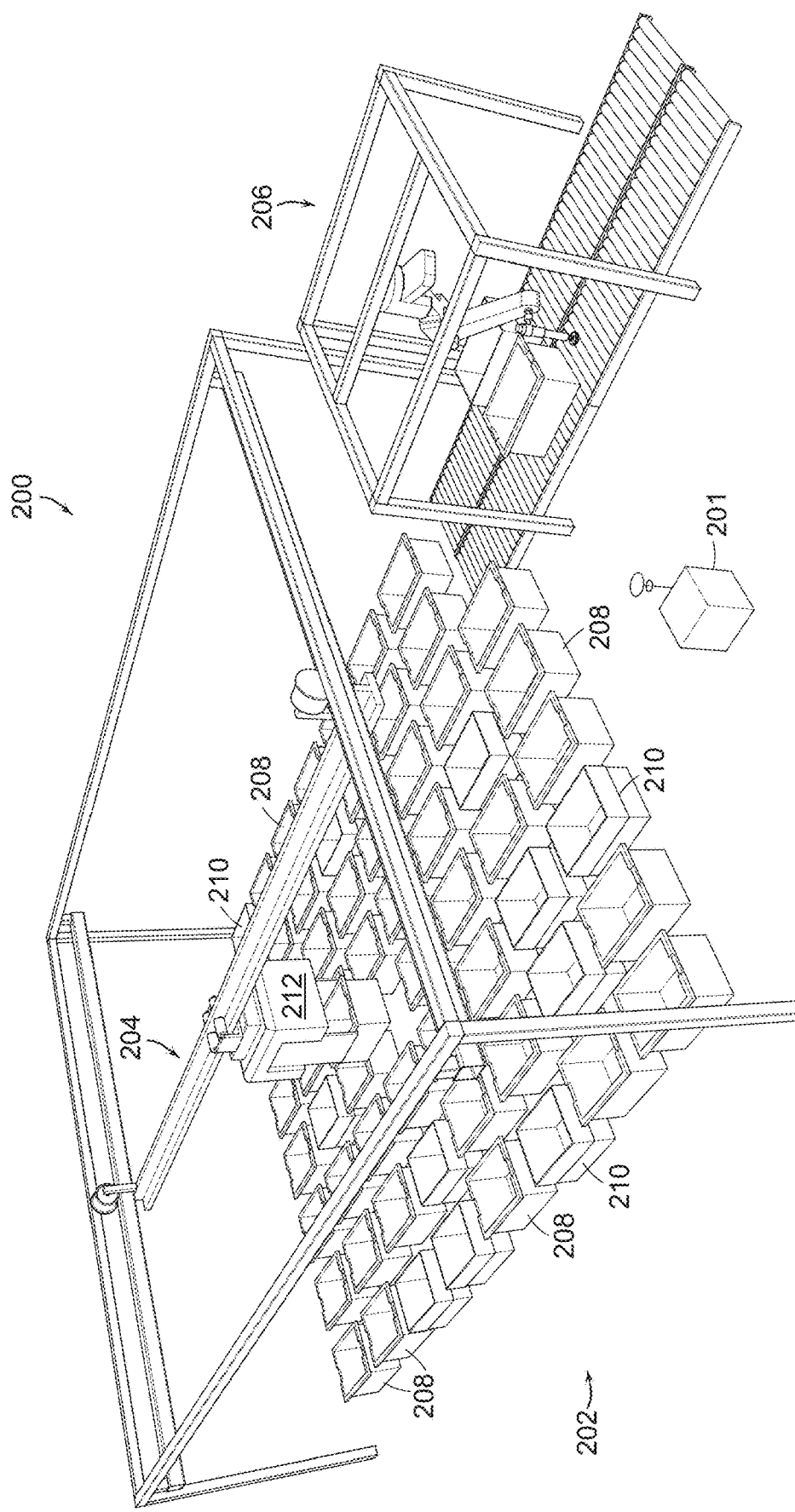
FIG. 3 shows an illustrative diagrammatic view of an object processing system in accordance with an embodiment of the present invention.
Figure 4:
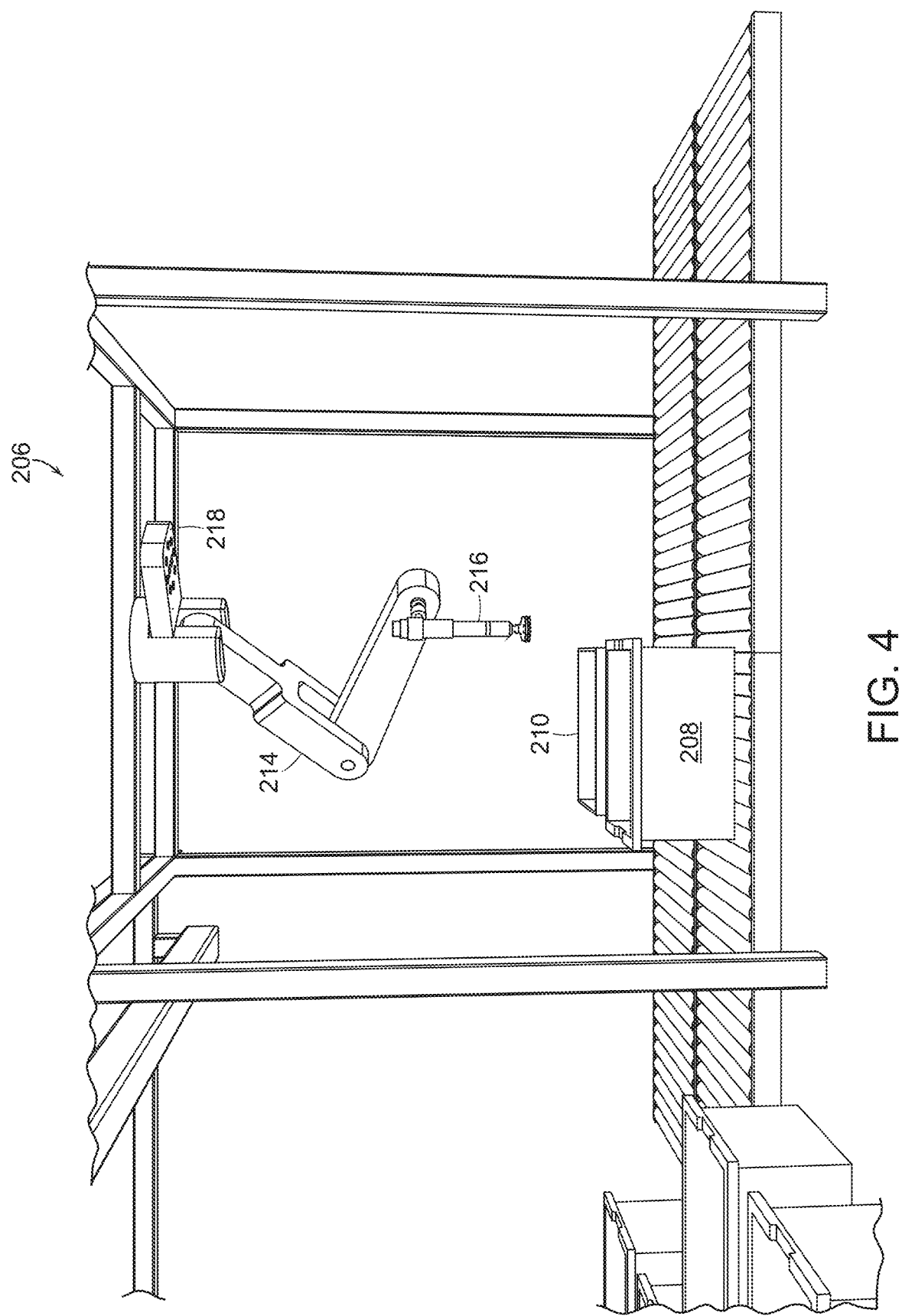
FIG. 4 shows an illustrative diagrammatic view of a portion of the object processing system shown in FIG. 3.
Figure 5:
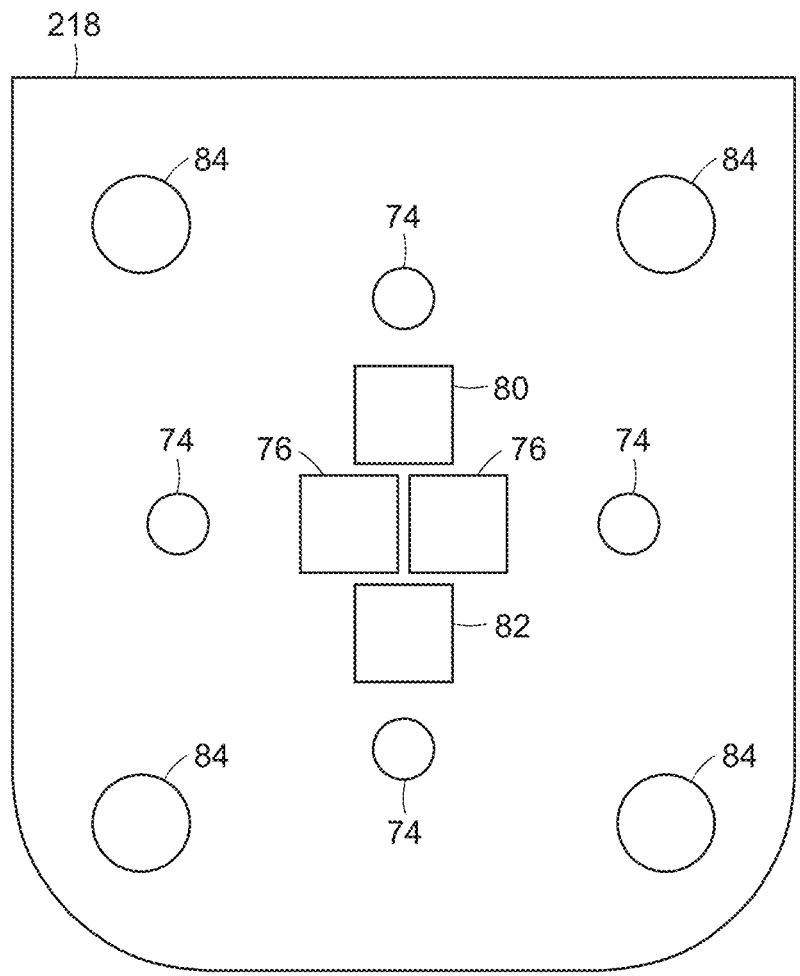
FIG. 5 shows an illustrative diagrammatic underside view of the detection system and capture system of the processing station of FIG. 4.

FIG. 3, for example, shows an object processing system 200 that includes one or more storage areas 202, bin retrieval and placement system 204, and a processing station 206. Input totes 208 and output boxes 210 in the storage area 202 may be separated or intermingled, and the retrieval and placement system 204 includes a grasping device 212 on an X-Y gantry that may access each of the input totes and output boxes, and bring them to the processing station 206. The operation of the system as well as the processing and learning discussed herein, may be provided by one or more processing systems 201. With further reference to FIG. 4, the processing station 206 includes a programmable motion device 214 (such as an articulated arm) having an end effector 216 as well as a perception unit 218. With further reference to FIG. 5, the perception unit 218 includes lights 74 as well as one or more perception units 76 (e.g., scanners or cameras) for detecting any identifying indicia (e.g., barcode, QR code, RFID, labels etc.) on objects within the bin 46 and for guiding the programmable motion device 56 to grasp the object within the bin with the end effector 216 (shown in FIG. 4). By this system, selected objects are acquired from the bin, and transported via the carrier 58 and then a carrier 62 to a desired box 64.

Figure 6A:
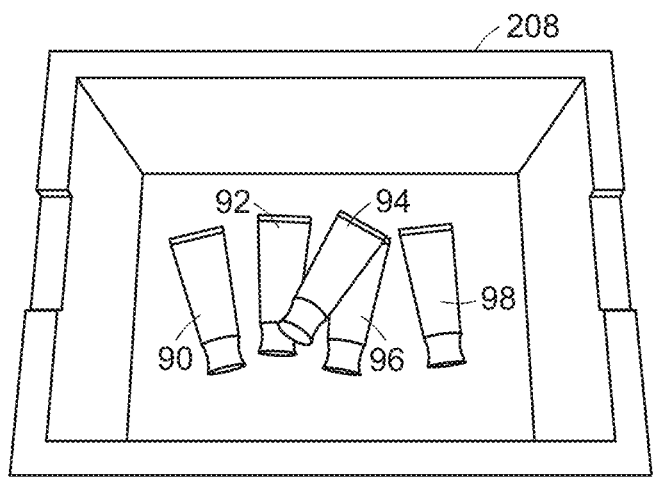
FIGS. 6A-6D show illustrative diagrammatic plan views of a bin undergoing volumetric and/or density analyses of homogenous objects, prior to analyses (FIG. 6A), prior to picking an object (FIG. 6B), following the pick of an object (FIG. 6C), and isolating the volume of the picked object from the bin volume (FIG. 6D)
Figure 6B:
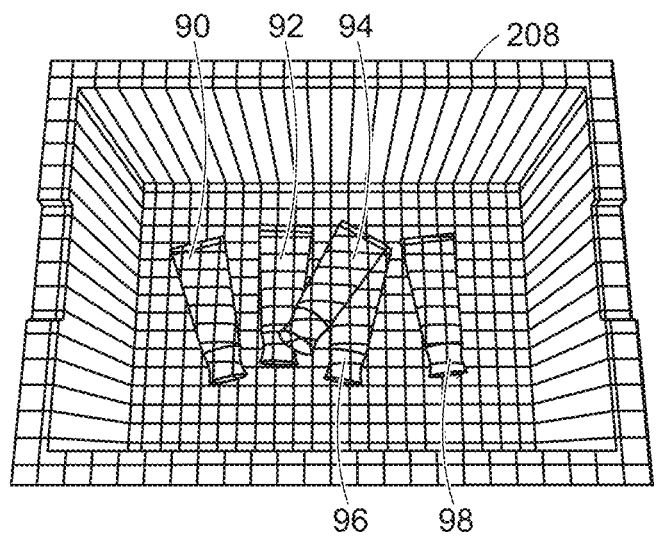
Figure 6C:
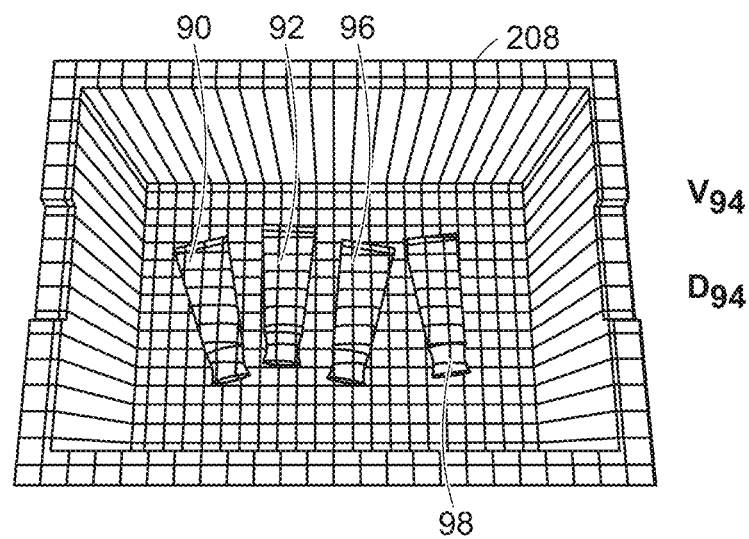

The perception unit 218 also includes scanning and receiving units 80, 82, as well as edge detection units 84 for capturing a variety of characteristics of a selected object of the whole bin. FIG. 6A shows a view from the capture system, which in accordance with an embodiment, may include a set of similar or dis-similar objects 90, 92, 94, 96, 98. The difference in volume between the scans shown in FIGS. 6B and 6C is the estimated volume of the removed object 94, ($V_{94}$). This volume is compared with recorded data regarding the item that is identified by the identifying indicia as provided by the detection system 72 or the recorded object data.

In particular, the contents of the bin are volumetrically scanned as shown in FIG. 6B prior to removing an object from the bin 208, and are volumetrically scanned after removing an object 94 from the bin 208 as shown in FIG. 6C. The volumetric scanning may be done using scanning and receiving units 80, 82 together with the processing system 42, that send and receive signals, e.g., infrared signals. In accordance with an embodiment, the volume captured in FIG. 6C is subtracted from the volume captured in FIG. 6B, and the difference is assessed as the estimated volume of the object 94 ($V_{94}$) that is removed. In accordance with other embodiments, the system, knowing that it will be acquiring object 94, may capture volumetric data regarding the object 94 while the object 94 is still in the bin (as shown in FIG. 6B). This may be done in place of or in addition to the volumetric subtraction (between FIGS. 6B and 6C) discussed above. In accordance with further embodiments, the scanning and receiving units 80, 82 may also be employed to determine an object's density, $D_{94}$, from knowing the object's mass and volume. The volumetric data may be obtained for example, using any of light detection and ranging (LIDAR) scanners, pulsed time of flight cameras, continuous wave time of flight cameras, structured light cameras, or passive stereo cameras.

Figure 6D:
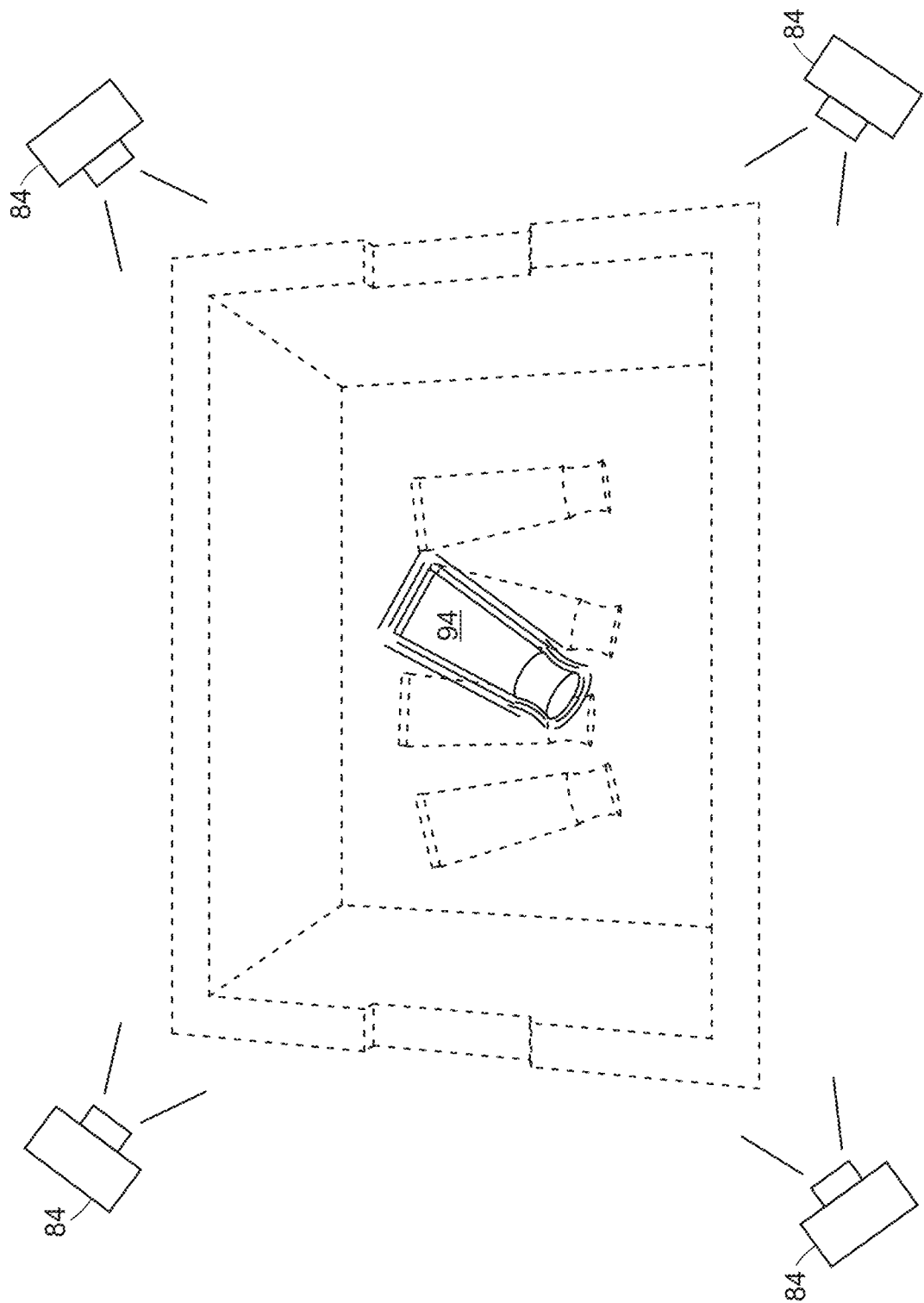

In accordance with further embodiments, the system may additionally employ edge detection sensors 84 that are employed (again together with the processing system 201), to detect edges of any objects in a bin, for example using data regarding any of intensity, shadow detection, or echo detection etc., and may be employed for example, to determine any of size, shape and/or contours as shown in FIG. 6D.

Figure 7:
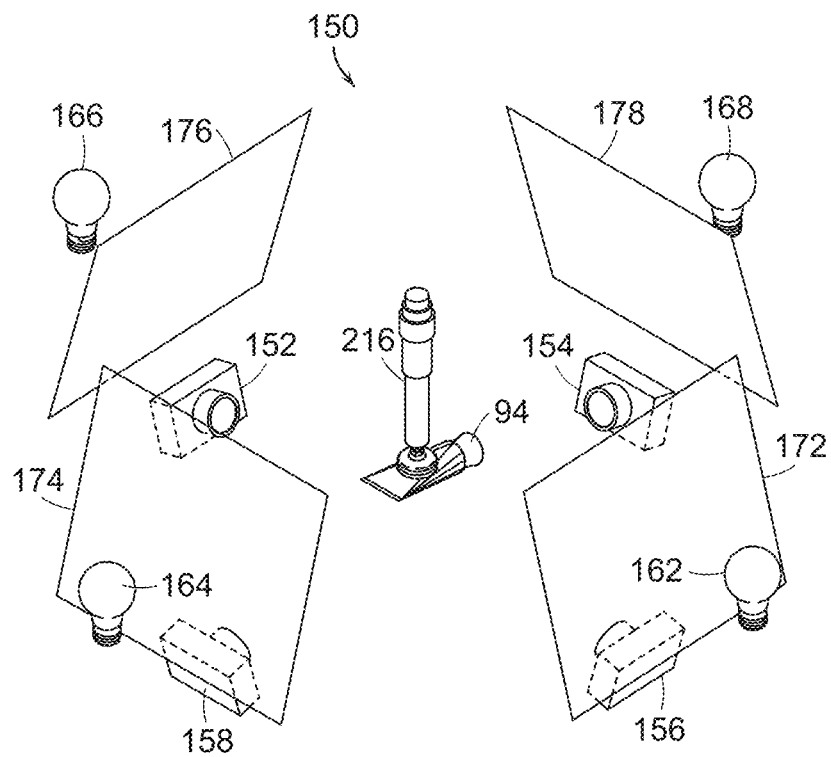
FIG. 7 shows an illustrative diagrammatic view of a plurality of perception units positioned around a scanning volume.
Figure 8:
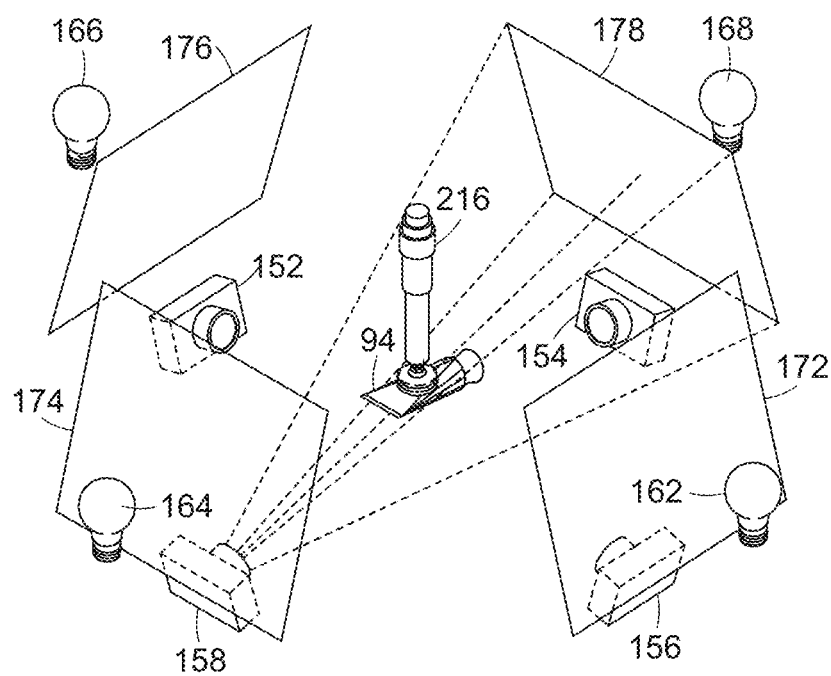
FIG. 8 shows an illustrative diagrammatic view of the plurality of perception units of FIG. 7 positioned around a scanning volume with a perception unit and illumination source pair being engaged.
Figure 9:
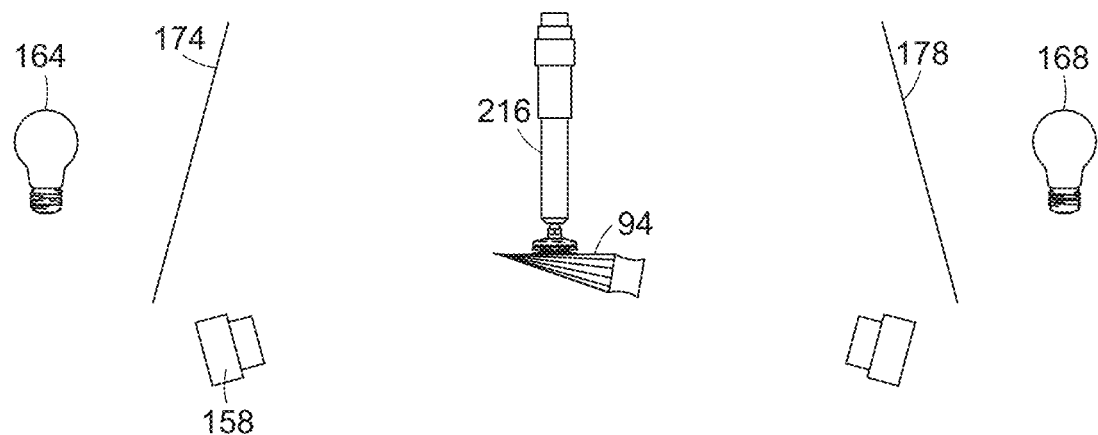
FIG. 9 shows an illustrative diagrammatic side view of [[the a pair]] a pair of a perception unit and illumination source of FIG. 7.
Figure 10:
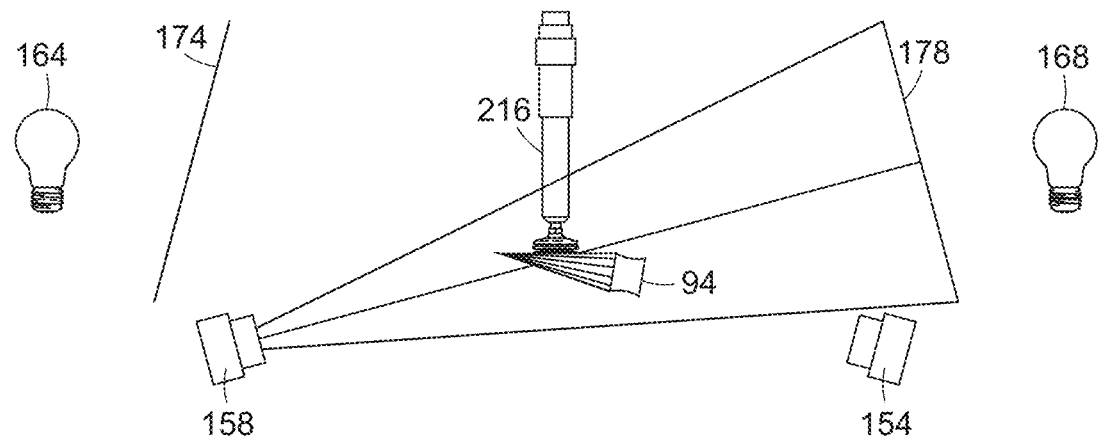
FIG. 10 shows an illustrative diagrammatic side view of FIG. 9 with the pair of the perception unit and the illumination source pair being engaged.

In accordance with further embodiments, the system may estimate a volume of an object while the object is being held by the end effector. Although with certain types of object processing systems (e.g., package sortation for shipping/mailing) volume may not be as helpful (for example when handling deformable plastic bags), in other systems such as store replenishment or e-commerce applications, volumetric scanning would be very valuable. In particular, the system may estimate a volume of picked item while being held by a gripper, and compare the estimated volume with a known volume. One approach is to estimate the volume of the one or more items while the gripper is holding the object (or objects), and then compare the observed volume to the a priori known volume of the item. With reference to FIGS. 7 and 8, one or more perception units 152, 154, 156, 158 (e.g., cameras or 3D scanners) are placed around a scanning volume. With further reference to FIGS. 9 and 10, opposite each perception unit is an illumination source 162, 164, 166, 168 as well as a diffusing screen 172, 174, 176, 178 in front of each illumination source.

Figure 11:
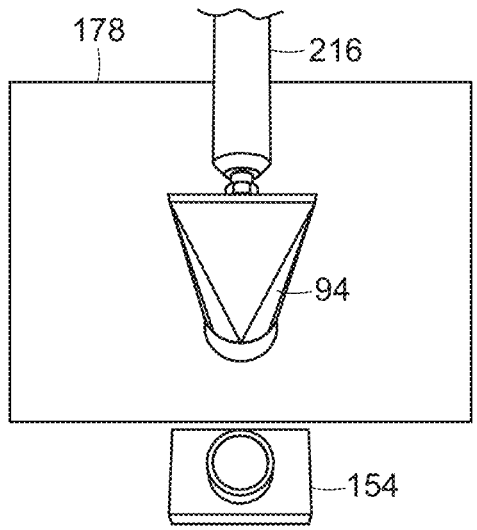
FIG. 11 shows an illustrative diagrammatic view of an object from a first perception unit.
Figure 12:
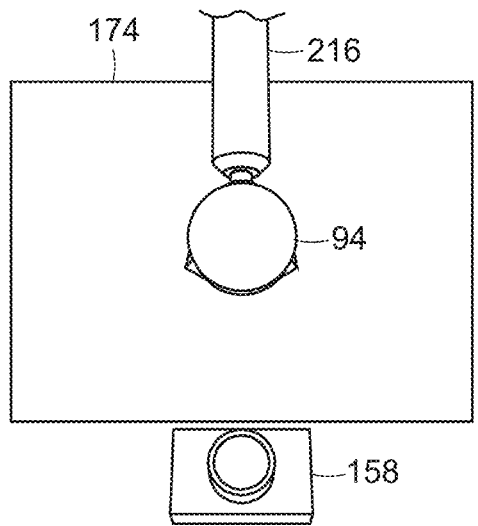
FIG. 12 shows an illustrative diagrammatic view of the object of FIG. 11 from a second perception unit.
Figure 13:
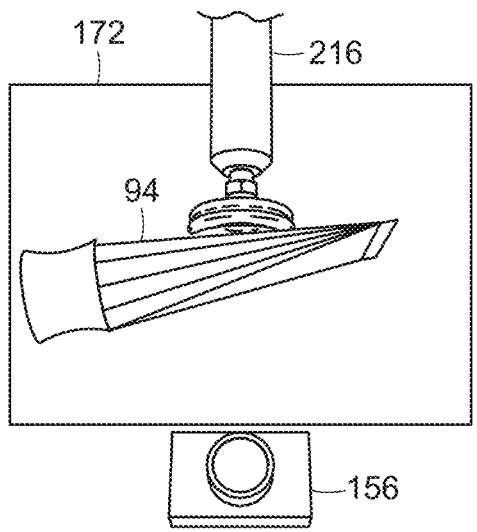
FIG. 13 shows an illustrative diagrammatic view of the object of FIG. 11 from a third perception unit.
Figure 14:
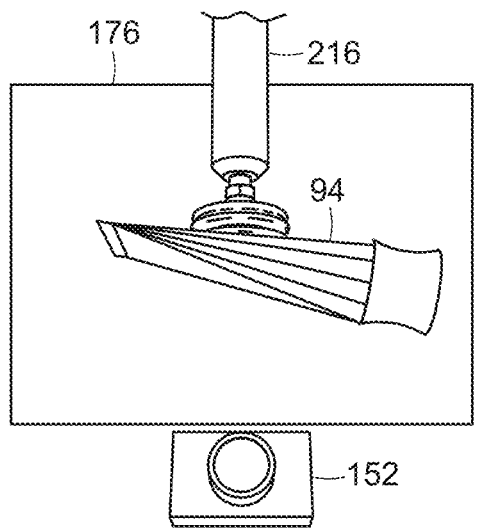
FIG. 14 shows an illustrative diagrammatic view of the object of FIG. 11 from a fourth perception unit.

As shown in FIG. 10, perception data regarding the object 94 as backlit by the illumination source (e.g., 168) and diffuser (e.g., 178) will be captured by each perception unit (e.g., 158). FIG. 11 shows the view of the object 94 from camera 158, FIG. 12 shows the view of the object from camera 154, FIG. 13 shows the view of the object from camera 152, and FIG. 14 shows the view of the object from camera 156. In accordance with various embodiments, three perception units may be used, spaced apart by one hundred twenty degrees, and in accordance with further embodiments, fewer perception units may be used (e.g., one or two), and the object may be rotated between data acquisition captures.

The scanning volume may be the volume above the area where the items are picked from; or the scanning volume may be strategically placed in between the picking location and the placing location to minimize travel time. Within the scanning volume, the system takes a snapshot of the volume of items held by the gripper. The volume could be estimated in a variety of ways depending on the sensor type as discussed above.

For example, if the sensors are cameras, then two or more cameras may be placed in a ring around the volume, directed slightly upward towards at a backlighting screen (as discussed above) that may be in the shape of sections of a torus, where the gripped volume is held in between all the cameras and the brightly lit white screen. The brightly lit screen backlights the one or more held objects, so that the interior volume is black. Each perception unit and associated illumination source may be activated in a sequence so that no two illumination sources are on at the same time. This allows easy segmentation of the held volume in the image.

The illumination may be provided as a particular wavelength that is not present in the room, or the illumination may be modulated and the detector may demodulate the received perception data so that only illumination from the associated source is provided. The black region once projected back into space, becomes a frustum and the objects are known to lie within a solid frustum. Each camera generates a separate frustum, with the property that the volume of the items is a subset of all of the frustums. The intersection of all the frustums yields an upper bound on the volume of the object(s). The addition of a camera improves the accuracy of the volume estimate. The gripper may be visible within the cameras, and because its position is known, its volume can be subtracted out of the frustum or volume estimate.

In accordance with other embodiments, 3D scanners may be used that obtain 3D images of the scanning volume, then the volume estimates are obtained in a similar way by fusing together the point clouds received from each sensor, but without the need for segmenting the images from the background using backlighting. Each 3D scanner returns a 3D image, which for each pixel in the image returns a depth, and again, may use any of light detection and ranging (LIDAR)

scanners, pulsed time of flight cameras, continuous wave time of flight cameras, structured light cameras, or passive stereo cameras, etc.

Figure 15:
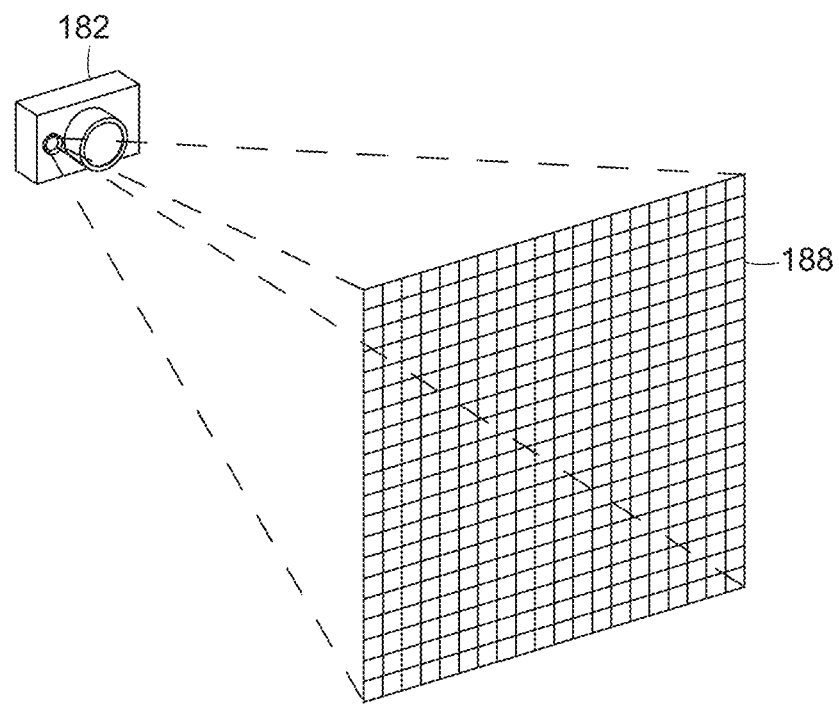
FIG. 15 shows an illustrative diagrammatic view of a 3D scanner and scan field for use in a system in accordance with an embodiment of the present invention.
Figure 16:
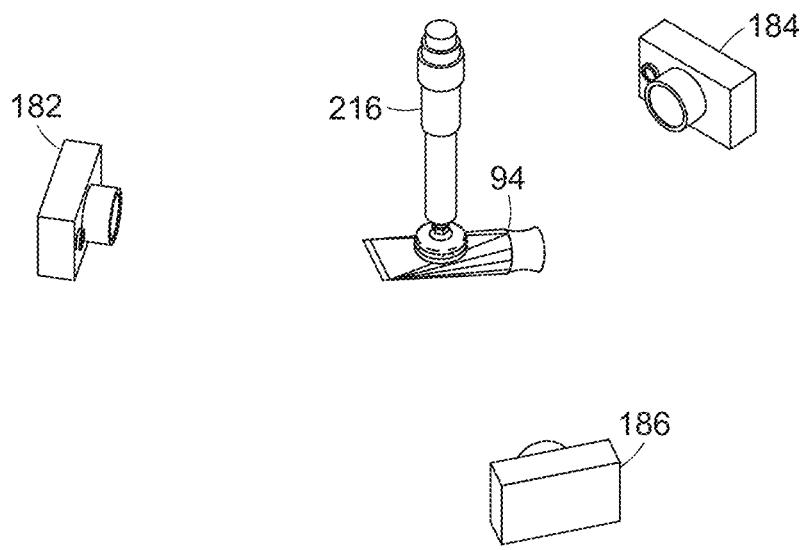
FIG. 16 shows an illustrative diagrammatic view of a system in accordance with an embodiment of the present invention that includes three 3D scanners.
Figure 17:
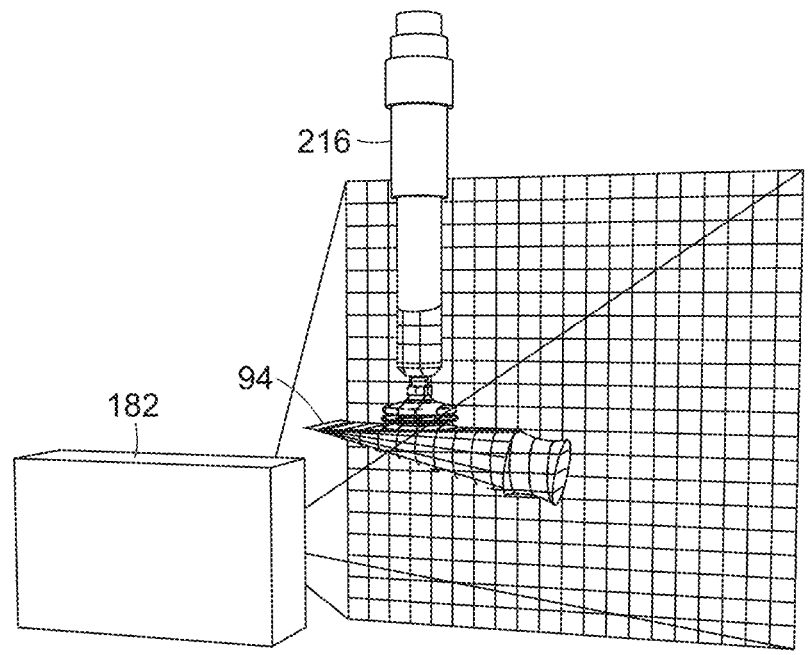
FIG. 17 shows an illustrative diagrammatic view of a 3D scanning system for use in accordance with an embodiment of the present invention scanning an object and a portion of an end effector grasping the object.
Figure 18:
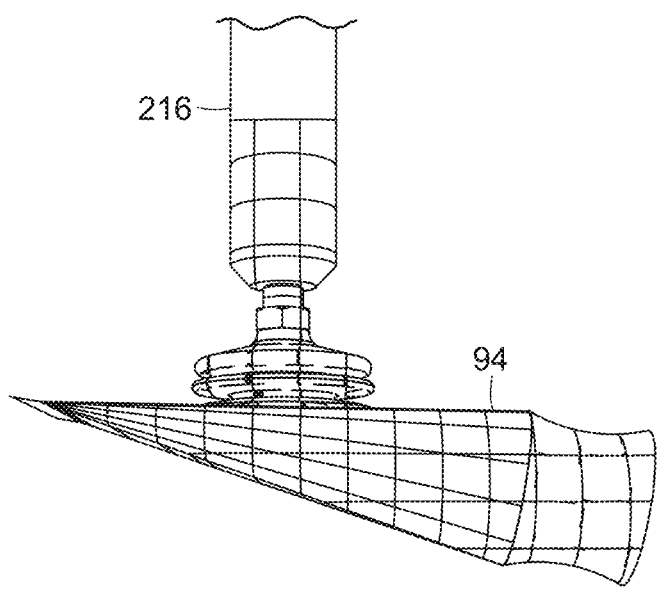
FIG. 18 shows an illustrative diagrammatic side view of the scanned object and scanned portion of the end effector to be subtracted from the full scanned volume.

FIG. 15, for example, shows a 3D scanner 182 that projects a grid 188 onto a field of view. The 3D scanner 182 may be used in a system 180 as shown in FIG. 16 together with one, two, or three other 3D scanners (two others are shown at 184, 186). The 3D scanners are directed toward a common volume in which the object 94 is positioned while attached to the end effector 216. Again, with three such 3D scanners, the scanners may be positioned one hundred twenty degrees apart (ninety degrees apart if four are used, and opposing each other if only two are used). With reference to FIGS. 17 and 18, each 3D scanner (e.g., 182) captures 3D data regarding the object. Again, the volume of the end effector may be removed from the captured data.

Figure 19:
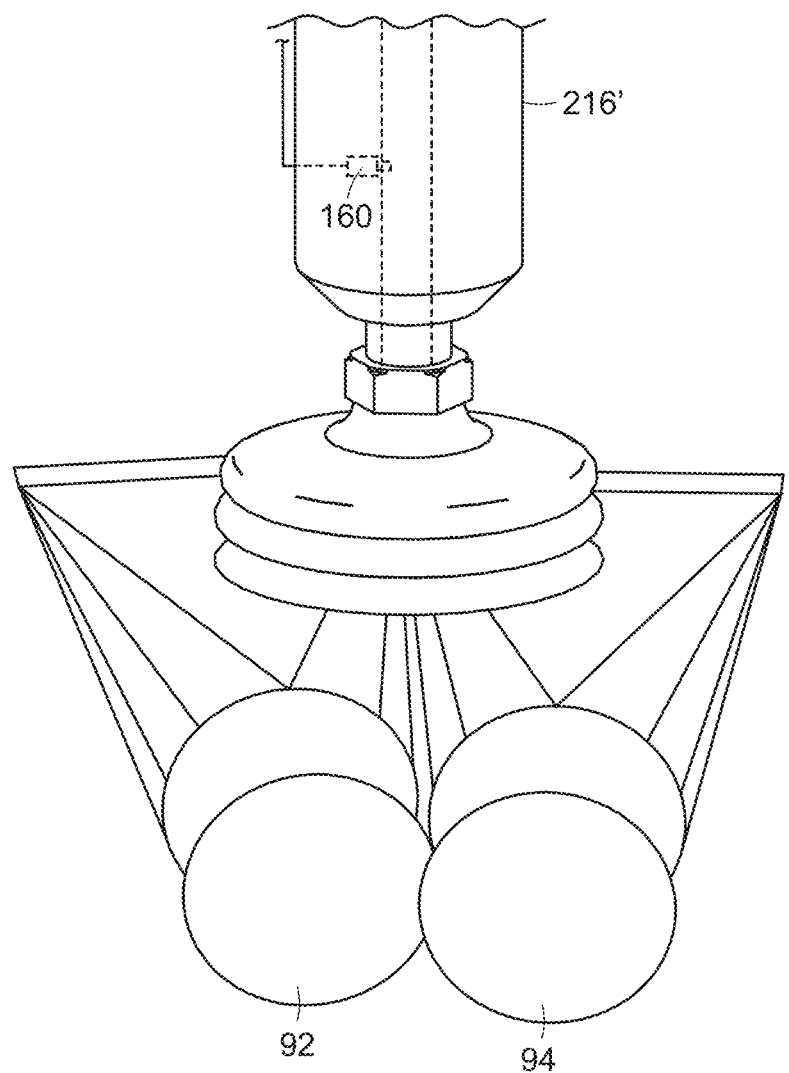
FIG. 19 shows an illustrative diagrammatic view of an end effector system for use in accordance with an embodiment of the present invention that includes a sensor for detecting potential errors in grasps such as, for example, a multi-pick.

In accordance with further embodiments, the system may detect multiple picks by automatically perceiving leaks from flow or pressure data. With reference to FIG. 19, the system may use an end effector 170 that includes a sensor 160 such as a flow sensor or pressure sensor. The system may compute from observations of flow and pressure while holding an item, statistics with which to compare to statistics collected when the same item was collected before. For example, the system may detect a much greater flow (or an increase in vacuum pressure) than anticipated for an object 94, which may be because two objects (92, 94) were grasped, causing a substantial amount of air to be drawn into the end effector 216'. The system may, therefore, compute from time series data of flow and/or pressure, while holding the object, the variance and other statistics with which to compare statistics from when the same item or similar item was previously gripped. The system may also compare the obtained values, and if the difference lies above a certain threshold, then the system may rule the instance as an instance of picking more than one of the item. As discussed above, the system may use a linear classifier, support vector machine, or other machine learning-based classifier to discriminate between single or multiple picks using flow or pressure data.

There are several process parameters associated with these actions at several stages during the flow of goods through the overall material handling system, including (a) whether to use a human or a robot, (b) which type of robot, (c) which type of effector, (d) the method and parameters for the algorithms that choose a grasp point, (e) how aggressively or quickly the object can be moved with the robot arm, (f) how to determine the outcome of the motion, (g) sensor thresholds for various decisions such as whether the item is grasped or not based on vacuum seal, and (h) the method by which it plans a path to transfer the object.

The facility handles over many tens of thousands of SKUs. The problem of producing process parameters for each SKU is a challenge. Further, there may be thousands of new SKUs introduced every year, so an efficient process to associate process parameters with new SKUs is crucial. When a new SKU is introduced, a human worker scans an object in the vendor case, and that SKU is transmitted to the facility software system, e.g., operating on computer processing system or systems 201. The worker or system sensors might produce additional information, such as images, weight, and dimensions that are stored in the system software database. The system would also store information provided by the vendor, which may include a name, a text description, weight, dimensions, an image, and other information.

The classifier software then produces an initial estimation of parameters, which might take the form of several different probabilities $p_i$, the probability that the item is in class i. It is possible that a new SKU may also introduce an entirely new class of items. When an object is handled for the first time, the initial process parameters are employed, and the outcome of the operation is saved. In the handling process, the system gains additional sensory information, which is saved in the system database. The outcome of the operation is also saved. If the initial grasp fails, the system might adjust the process parameters to discourage future grasps at the same location. If the object is dropped during the picking process, the system might adjust the motions to be less aggressive. If damage is noted, parameters might be adjusted for more careful drops, or a different picking station, or a different size vacuum cup.

Figure 20:
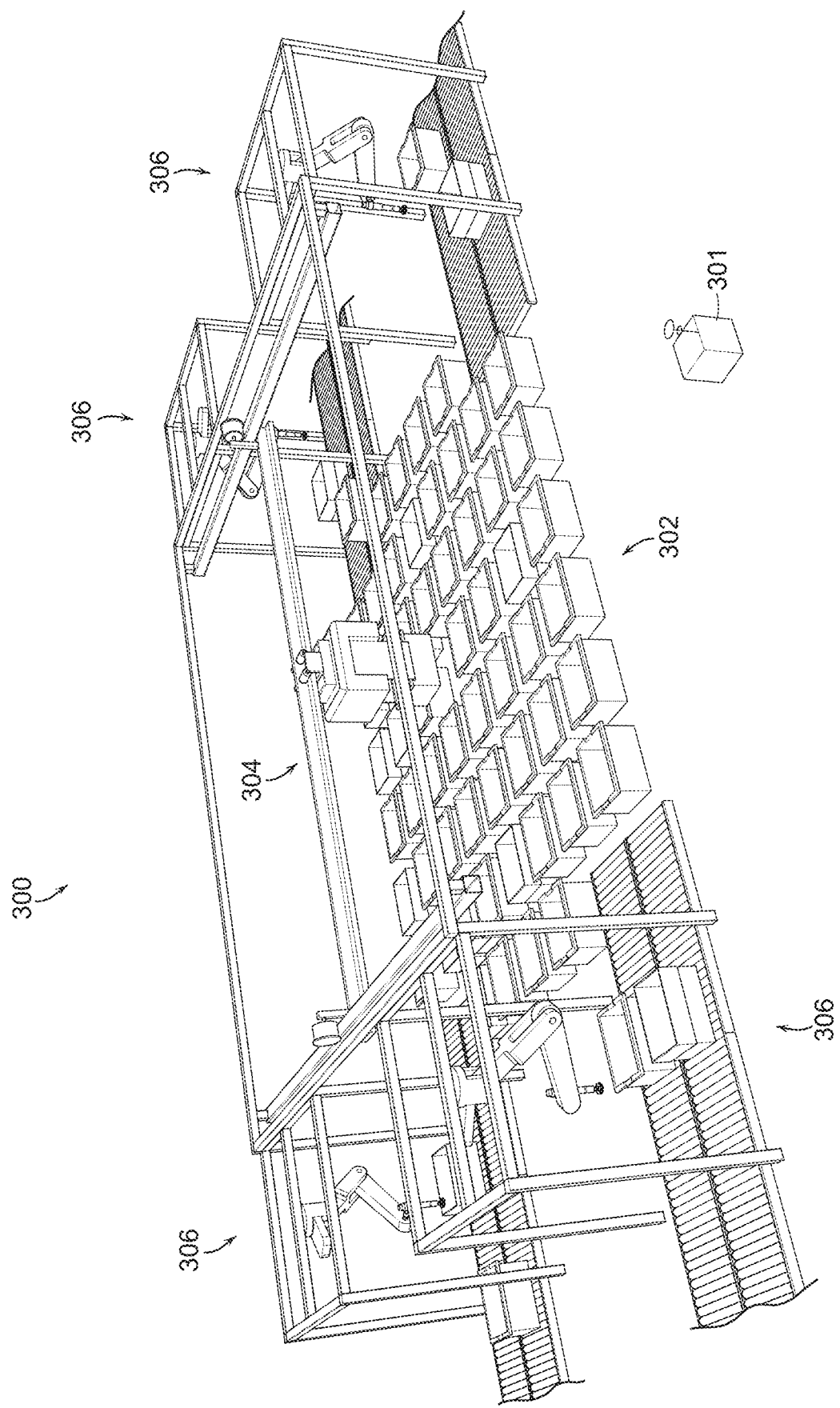
FIG. 20 shows an illustrative diagrammatic view of a processing system in accordance with a further embodiment of the present invention that includes a programmable motion system suspended from an X-Y gantry.

A similar process is followed each time the object is handled, so that the system builds up in the database a record of all its experience. As this record grows, the item's class will be determined with greater confidence, and other information including process parameters will also be refined. This embodiment includes a number of variations. Within a single distribution center, through use of a common database, the experiences of all robots are shared. By linking distribution centers together, the experiences of all robots can be shared across the enterprise. FIG. 20, for example, shows an object processing system 300 that includes one or more storage areas 302, bin retrieval and placement system 304, and a plurality of processing stations 306. Input totes 308 and output boxes 310 in the storage area 302 may be separated or intermingled, and the retrieval and placement system 304 includes a grasping device 312 on an X-Y gantry that may access each of the input totes and output boxes, and bring them to the processing station 306 as discussed above with reference to FIG. 3. Each processing station 306 is similar to the processing station 206 discussed above, and includes a programmable motion device (such as an articulated arm) having an end effector as well as a perception unit as discussed above under the control of computer processing system or systems 301.

Another variation is that when the system is idle, or when the load is light, the system may request objects from the AS/RS, send the objects to various picking stations, gather more experience with the items, and refine the associated data. Another variation is that in addition or instead of the robot picking, the process parameters include which person is doing the manual picking. Person X may be more adept at handling small SKUs, and person Y may be more capable of lifting heavy items. The system learns from the person's throughput data which objects the person handles best and worst on an object-specific basis, and uses this information to route goods to manual stations, or manual stations and robotic stations and optimizes the warehouse-wide handling activity.

In accordance with a further embodiment, the invention provides a system in a shipping center. Objects may vary considerably, including boxes of different sizes and weight, polybags, padded mailers, envelopes, shipping tubes, and others. All the objects are sorted by destination, loaded into plastic bags, and these plastic bags are loaded into trailers. Some packages arrive at the facility from local vendors, including local E-commerce order fulfillment centers. Other packages arrive from other shipping centers. All these packages are loaded onto conveyors that carry the packages to robotic picking stations as discussed in more detail below. The robot is equipped with a variety of sensors including cameras and optical barcode scanners. In some cases, a barcode is visible allowing the system to retrieve the object's identity and associated information. In some other cases, cameras allow the system to estimate the item class and other information relevant to the picking operation.

Figure 21:
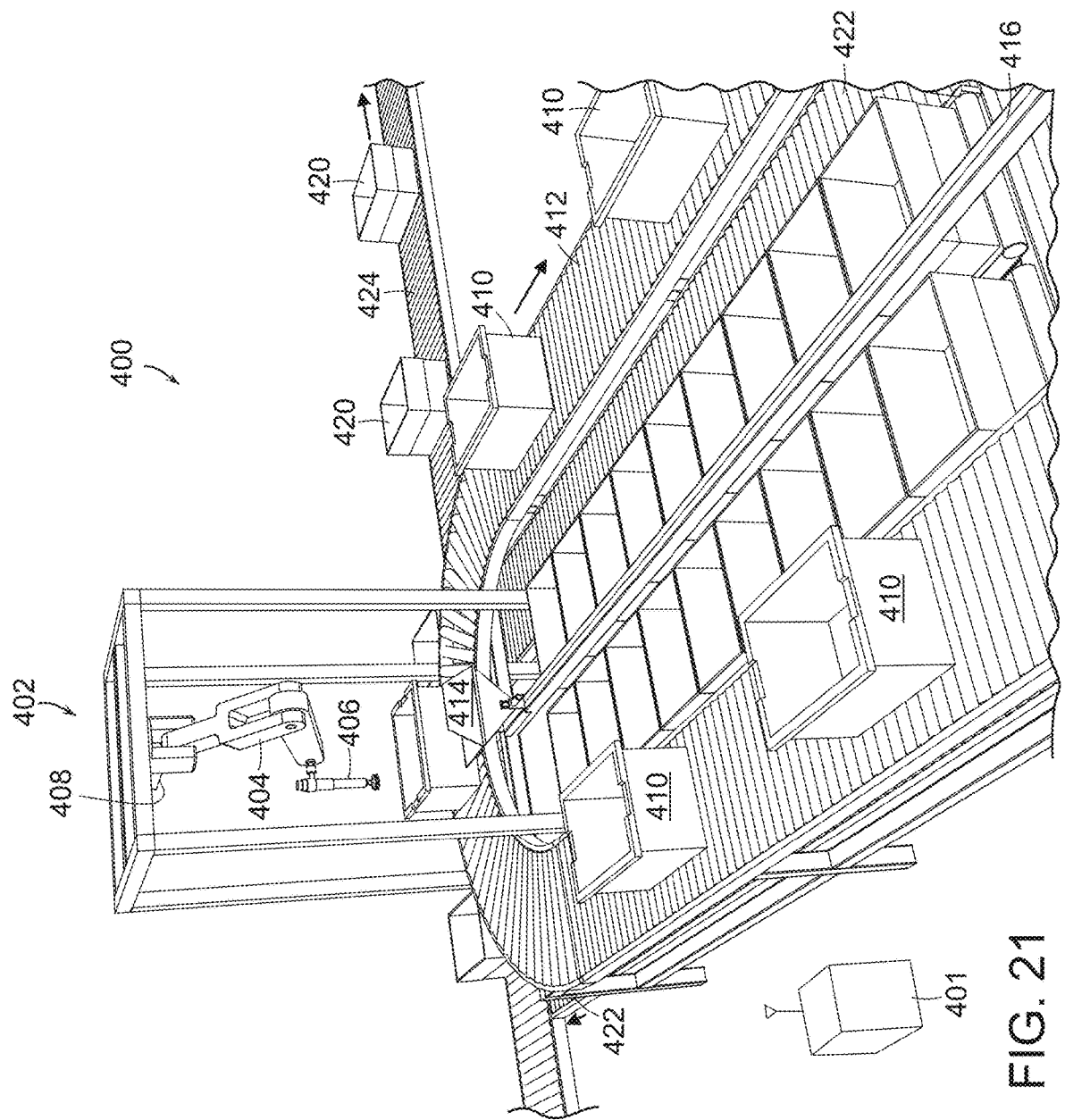
FIG. 21 shows an illustrative diagrammatic view of a processing system in accordance with a further embodiment of the present invention that includes a U-shaped conveyor and a programmable motion system.
Figure 22:
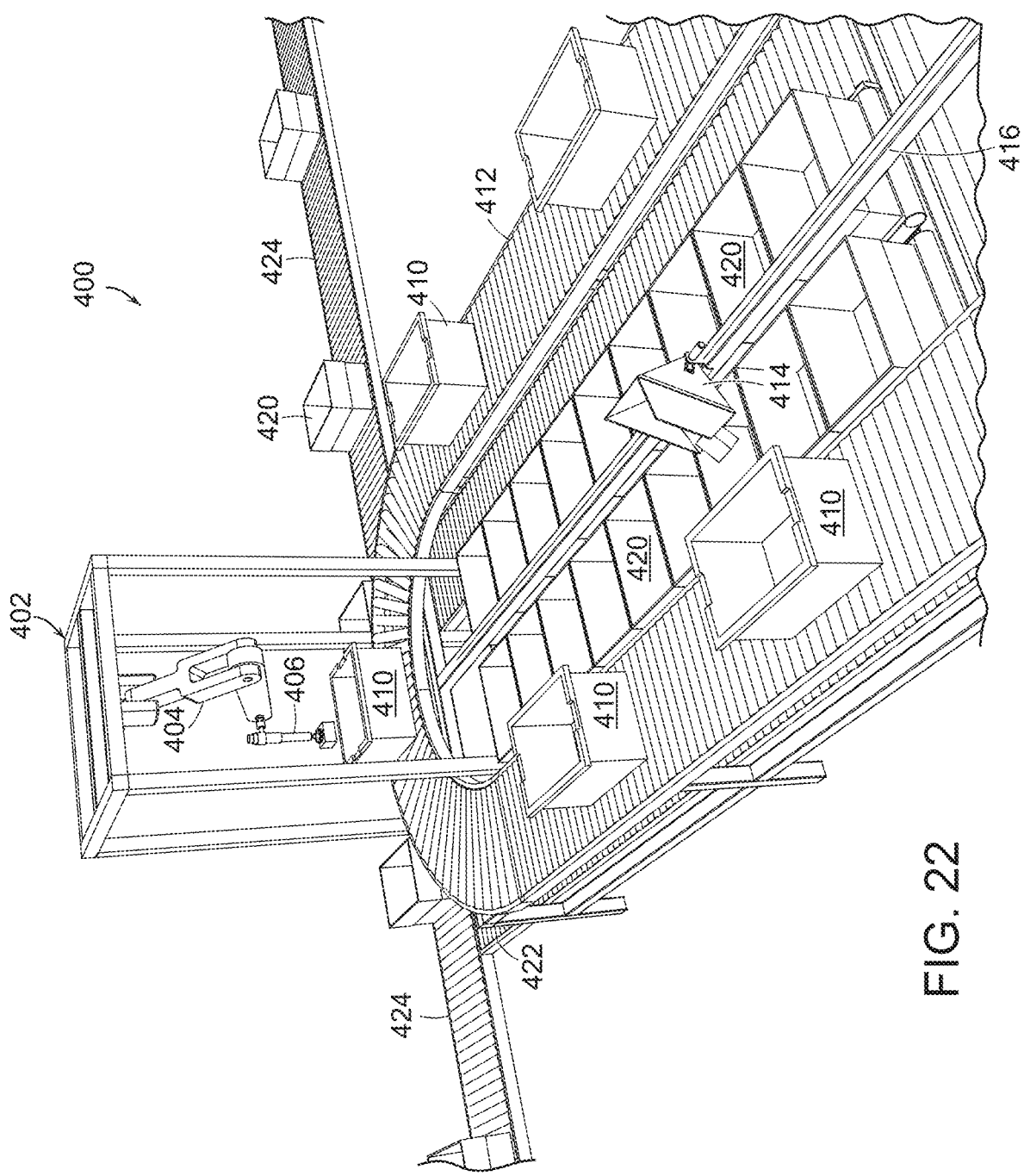
FIG. 22 shows an illustrative diagrammatic view of the portion of the distribution station shown in FIG. 21 with the carriage moved along the rail and tipping to drop an object from the carriage.
Figure 23:
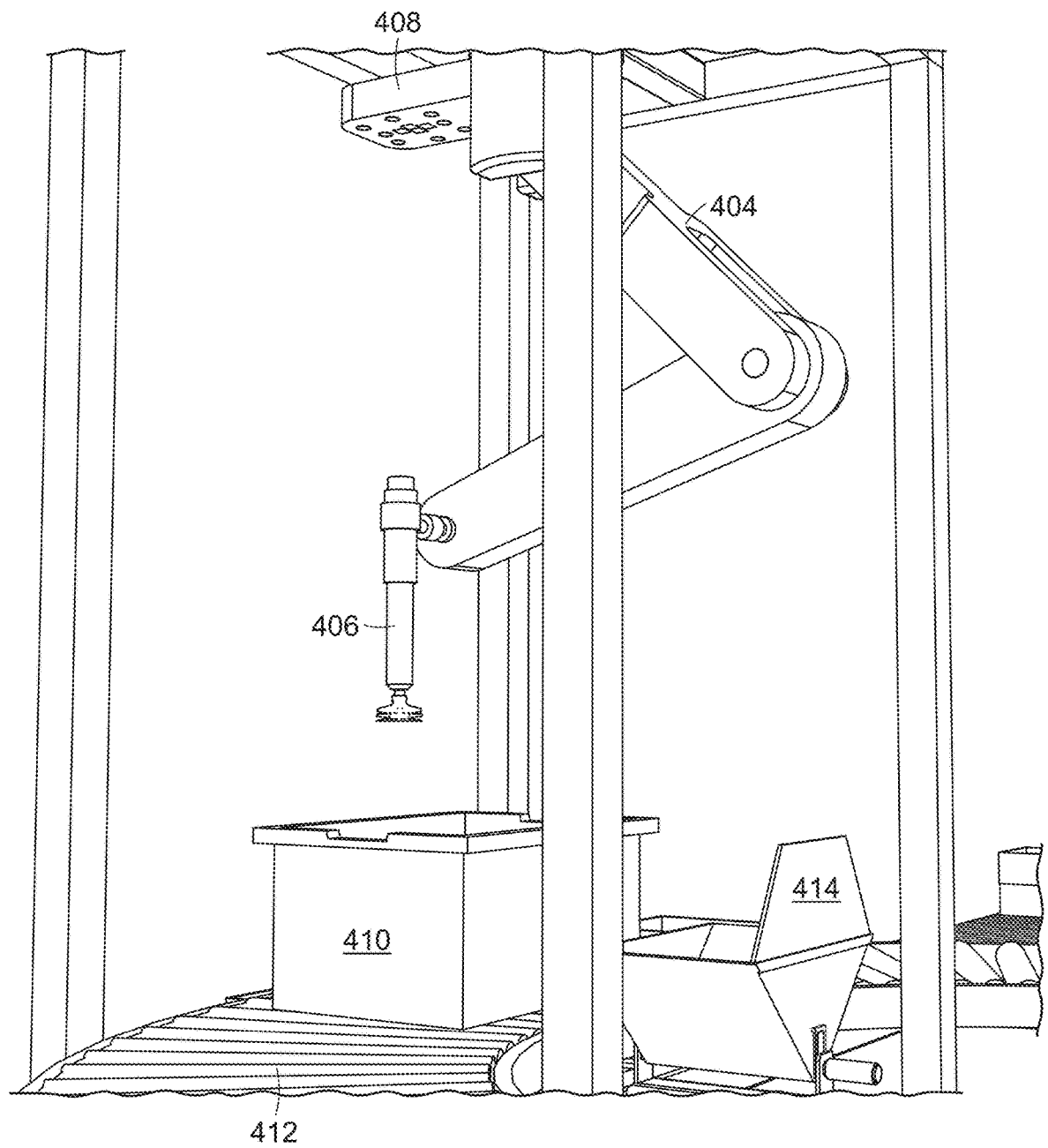
FIG. 23 shows an illustrative diagrammatic view of a portion of the processing system of FIG. 21.

FIG. 21, for example, shows a processing system 400 that includes a programmable motion system 402. The programmable motion system 402 includes an articulated arm 404 and an end effector 406. The system 400 may retrieve objects from bins 410 that are provided on conveyors 412, and place the retrieved objects into a reciprocating carriage 414 that travels along a rail 416 between rows of boxes 420, and as further shown in FIG. 22 is adapted to drop an object into one of the output boxes 420. Completed boxes may be urged onto output conveyors 422, which direct the completed boxes to a collected output conveyor 424.

The system 402 includes a perception unit 408, and with further reference to FIGS. 23 and 24A-D, the perception unit 408 is similar to the perception unit 218 discussed above with reference to FIG. 5, and includes lights and perception units, and scanning and receiving units, as well as edge detection unit. Each perception unit 408 may therefore capture identifying indicia, and provide volumetric 3D scanning as discussed above.

Figure 24A:
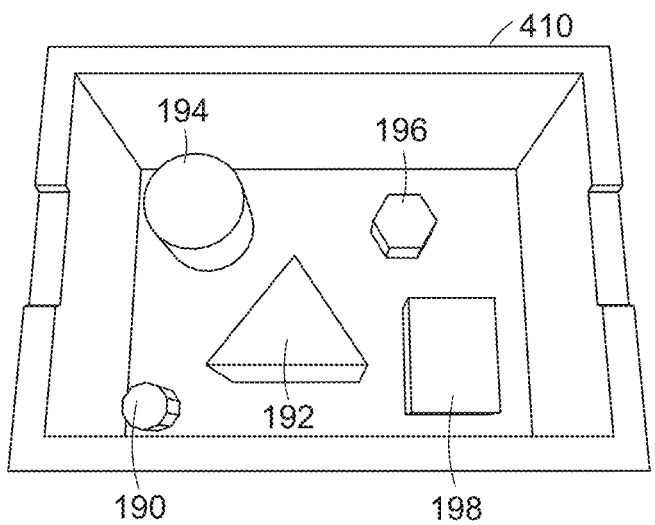
FIGS. 24A-24D show illustrative diagrammatic plan views of a bin undergoing volumetric and/or density analyses of dissimilar objects, prior to analyses (FIG. 24A), prior to picking an object (FIG. 24B), following the pick of an object (FIG. 24C), and isolating the volume of the picked object from the bin volume (FIG. 24D)
Figure 24B:
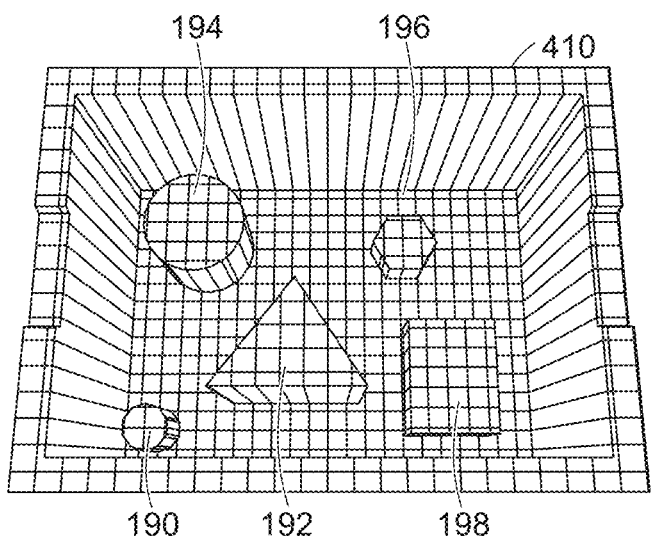
Figure 24C:
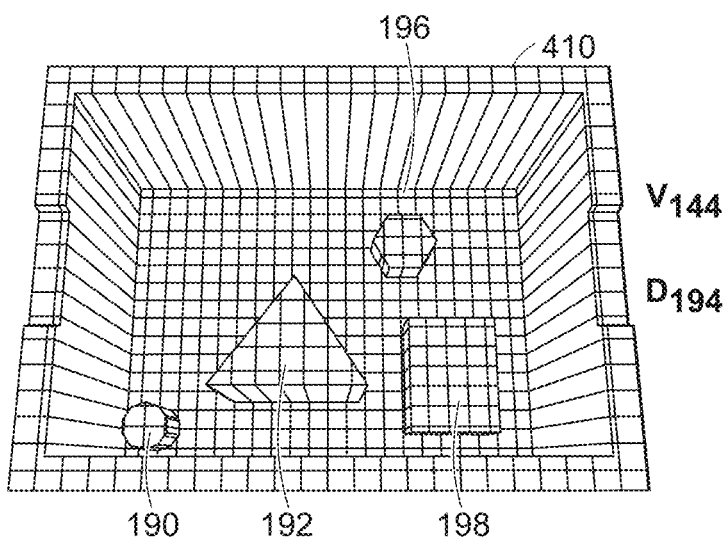

The perception unit 408 includes scanning and receiving units 80, 82, as well as edge detection units 84 (as discussed above) for capturing a variety of characteristics of a selected object or the whole bin. FIG. 24A shows a view from the volumetric detection system, which in accordance with an embodiment, may include a set of similar or dis-similar objects 190, 192, 194, 196, 198. The contents of the bin are volumetrically scanned as shown in FIG. 24B prior to removing an object from the bin 46, and are volumetrically scanned after removing an object 194 from the bin 46 as shown in FIG. 24C.

The volumetric scanning may again be done using scanning and receiving units 80, 82 together with the processing system 42, that send and receive signals, e.g., infrared signals. In accordance with an embodiment, the volume captured in FIG. 24C is subtracted from the volume captured in FIG. 24B, and the difference is assessed as the volume of the object 194 ($V_{194}$) that is removed. In accordance with other embodiments, the system, knowing that it will be acquiring object 194, may capture volumetric data regarding the object 194 while the object 194 is still in the bin (as shown in FIG. 24B). This may be done in place of or in addition to the volumetric subtraction (between FIGS. 24B and 24C) discussed above. In accordance with further embodiments, the scanning and receiving units 80, 82 may also be employed to determine an object's density, $D_{194}$, from knowing the object's mass and volume.

Figure 24D:
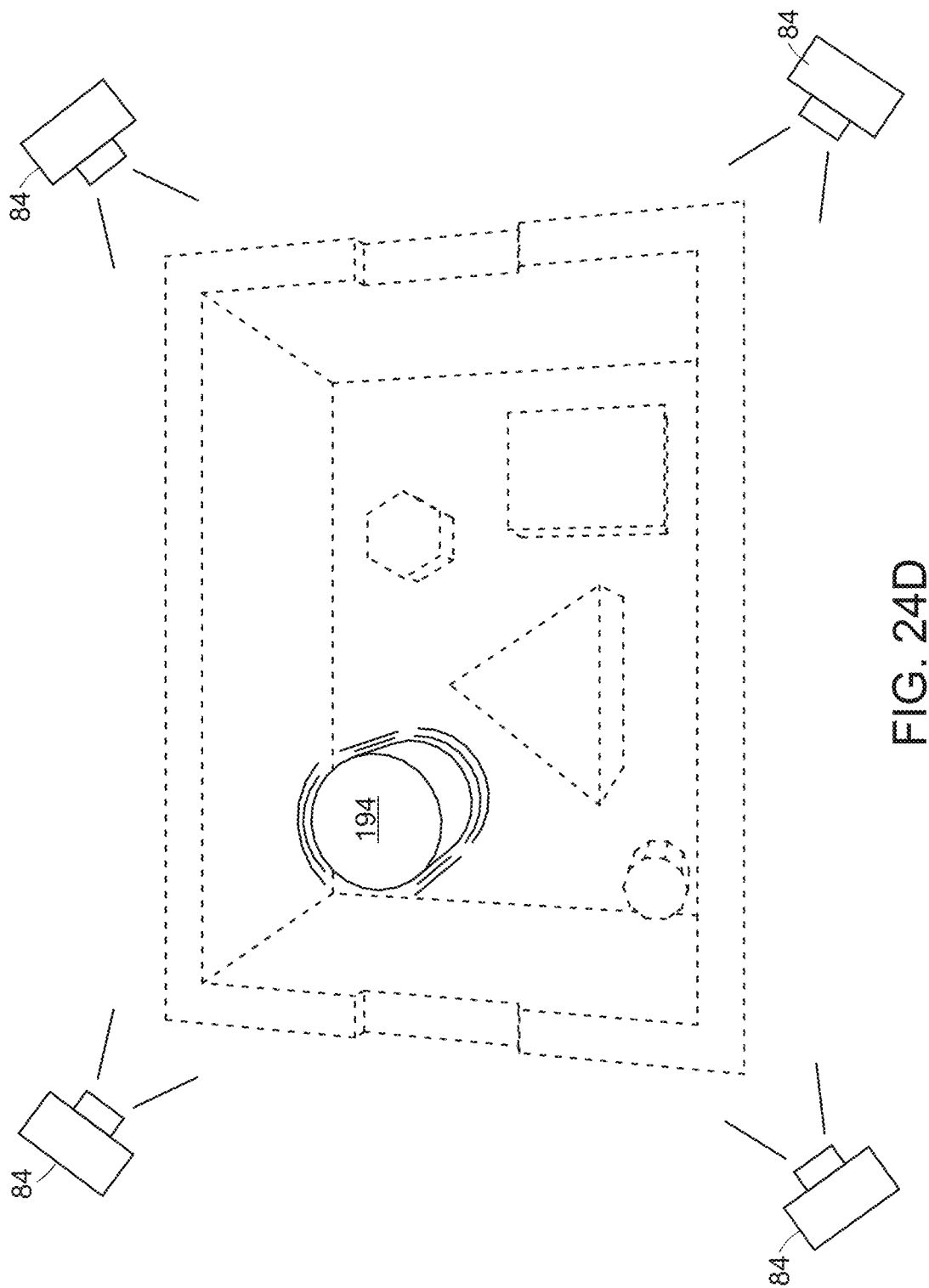

In accordance with further embodiments and with reference to FIG. 24D, the system may additionally employ the edge detection sensors 84 that are employed (again together with the processing system 42), to detect edges of any objects in a bin, for example using any of image intensity data, shadow detection, or echo detection etc., and may be employed for example, to determine any of size, shape and/or contours.

Figure 25:
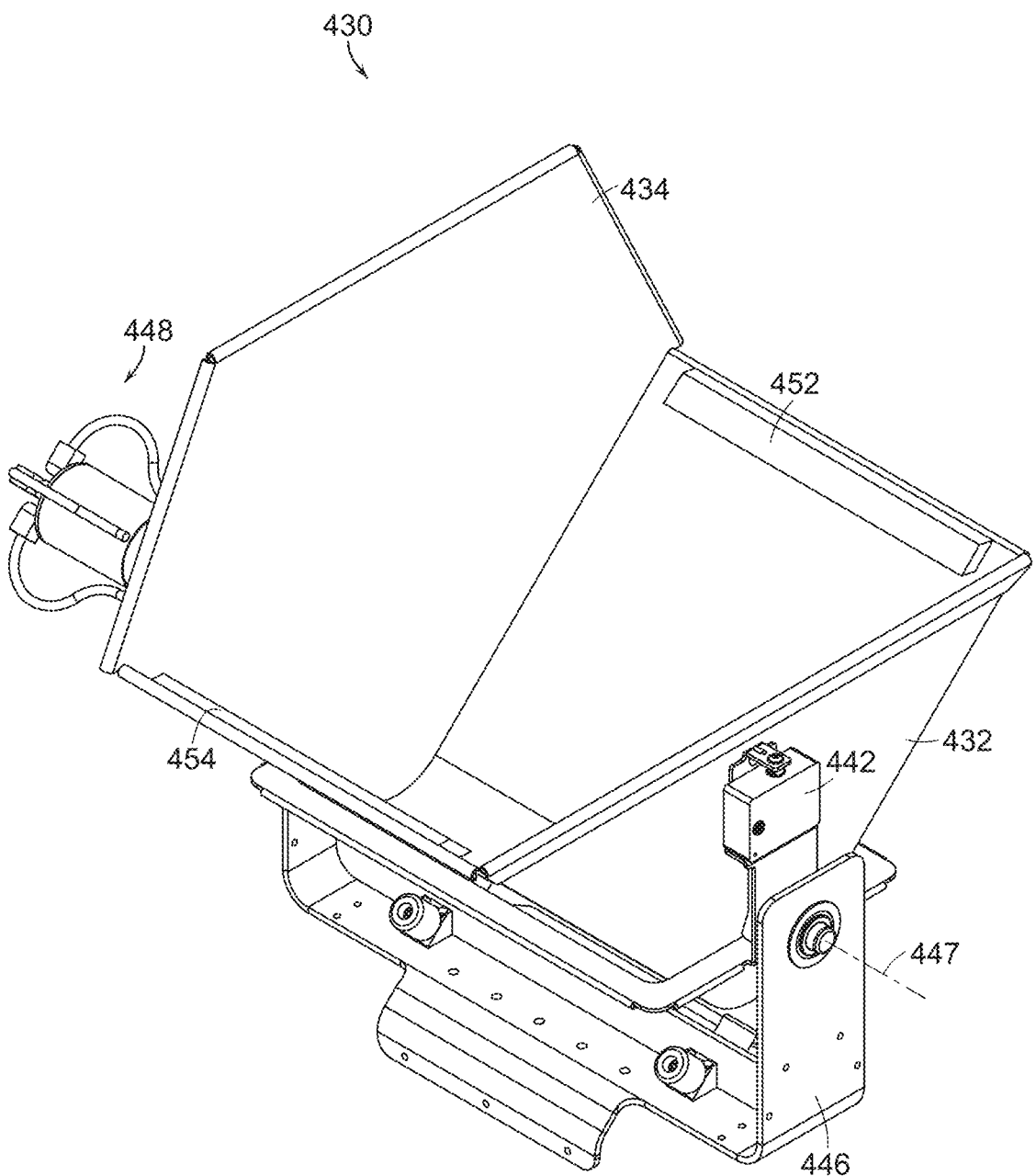
FIG. 25 shows an illustrative diagrammatic view of another weight sensing carriage for use in a system in accordance with another embodiment of the present invention.
Figure 26:
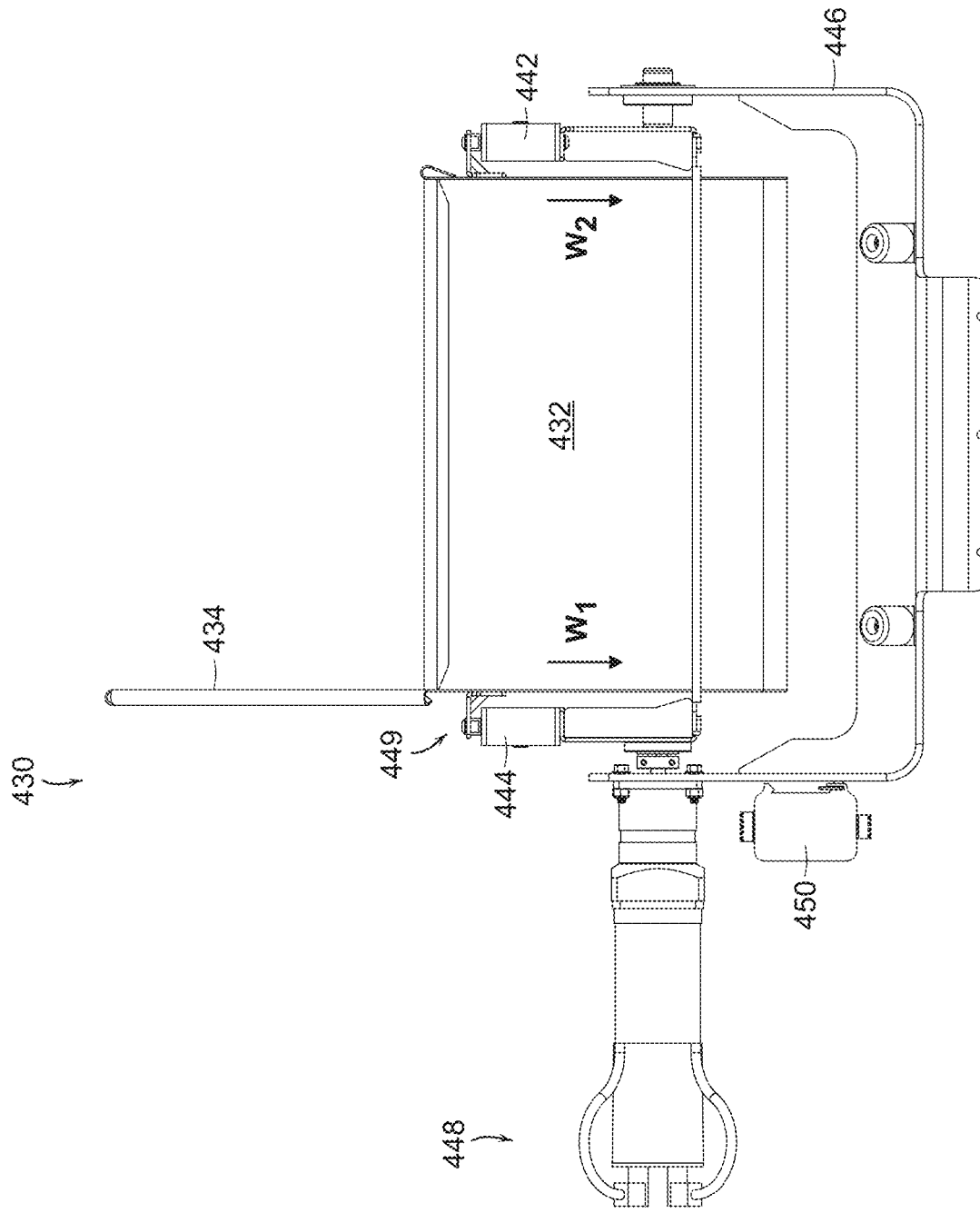
FIG. 26 shows an illustrative diagrammatic side view of the weight sensing carriage of FIG. 25.

FIGS. 25 and 26 show a carriage 430 in accordance with an embodiment of the invention having a body 432 that includes a tall back wall 434 against which objects may be re-directed into the generally V-shaped body of the carriage. In particular, the programmable motion system 402 may drop objects into the carriage having the body 432 such that the articulated arm 404 is located on the side of the carriage 430 opposite the side with the tall back wall 434.

The carriage 430 is mounted via load cells 442, 444 on a frame 446, and it's motion along a rail and in tipping, is controlled by actuation system 448. In particular, the pair of load cells 442, 444 are coupled to the frame 446, and the carriage body 432 is mounted to (and is suspended by) the load cells. By locating the load cells in the body of the carriage close to the object(s), a highly reliable weight measurement may be obtained. Once an object is detected by the beam-break transmitter and receiver pair 452, 454, the system in accordance with an embodiment, will average the weight value of the two load cells ($W_1$, $W_2$) together, double the result, and subtract the weight of the body 432. In this way, weight of objects may also be estimated. In accordance with other embodiments, the load cells themselves may register a change, indicating that the carriage has received or expelled an object.

Figure 27:
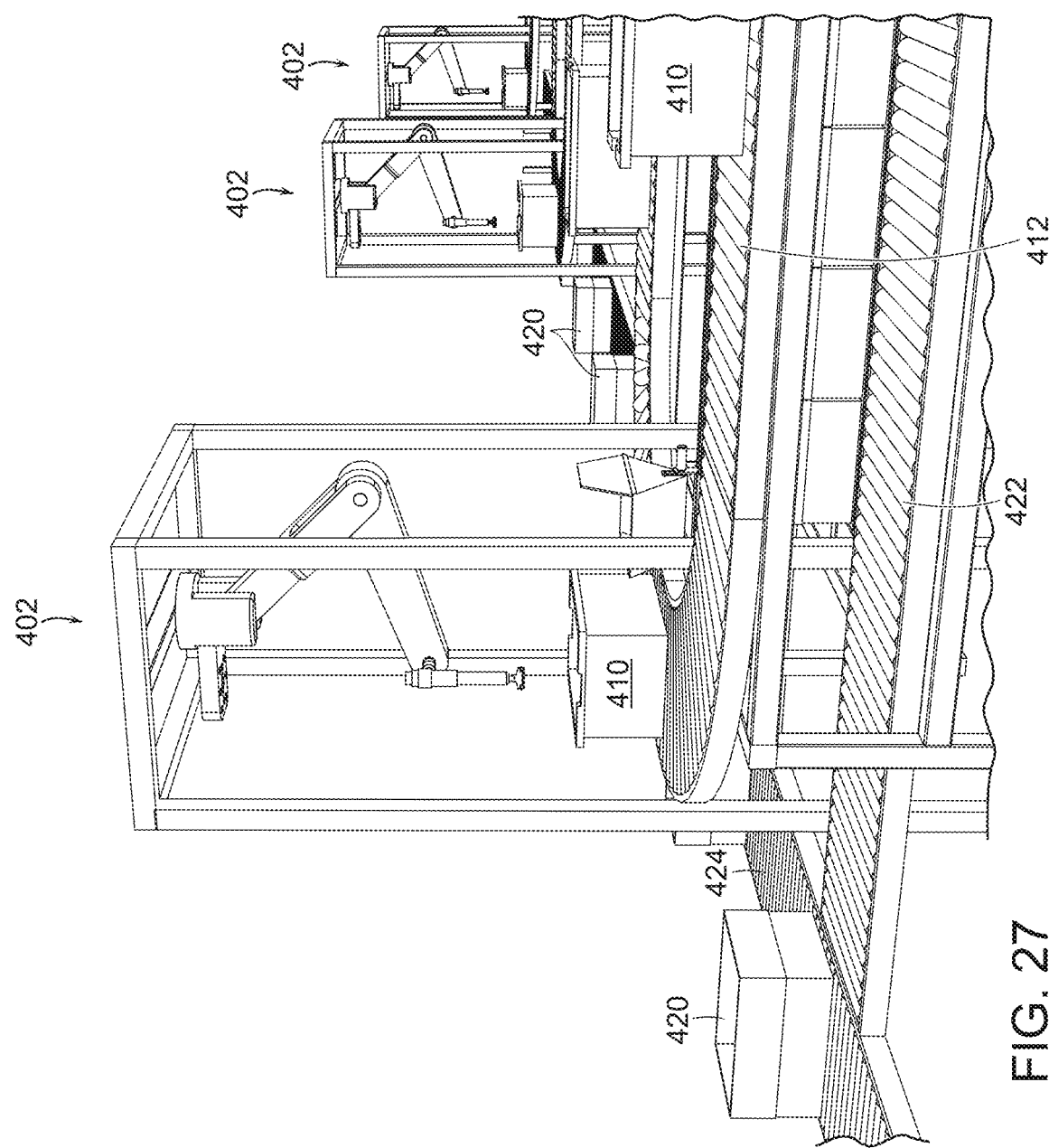
FIG. 27 shows an illustrative diagrammatic view of a system that includes a plurality of processing systems of FIG. 21.

Communication and electronic controls are provided by electronic processing and communication system 450. The carriage body 432 is adapted to be rotatable about an axis 447 (to empty its contents), and the carriage body 432 is attached to a top portion 449 of the load cells 442, 444 above the axis of rotation 447. Communication and electronic controls are provided by electronic processing and communication system 401 (shown in FIG. 21). Again, the load cells 442, 444 may be used to determine the weight of the contents of the carriage. As shown in FIG. 27, the system may be scaled such that multiple programmable motion systems 402 may process objects into multiple carriages 414 and output boxes 420.

Figure 28:
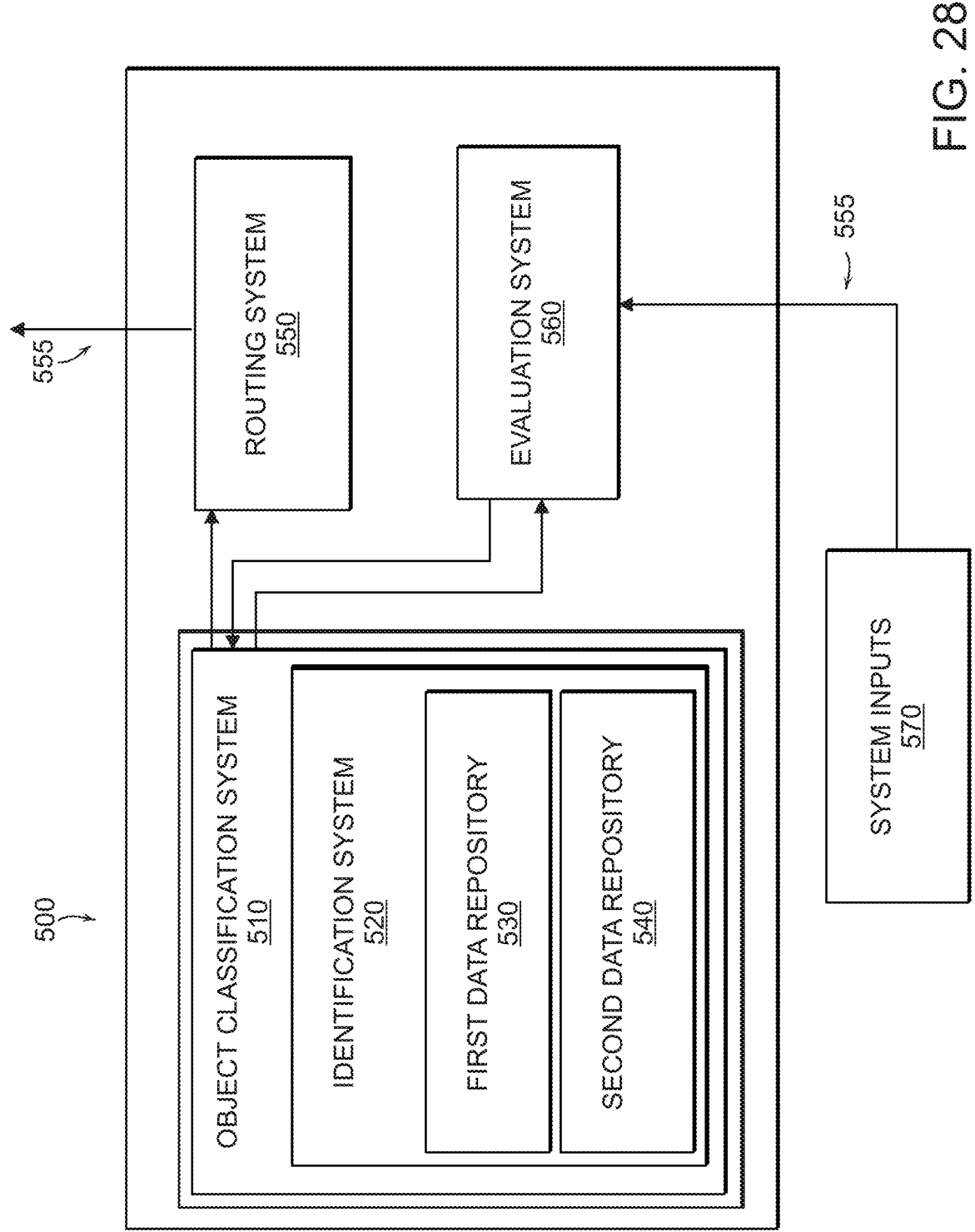
FIG. 28 shows an illustrative diagrammatic view of the processing steps of the processing control system in accordance with an embodiment of the present invention.

With reference to FIG. 28 therefore, the processing control system 500 may include an object classification system 510 including an identification system 520 for identifying an object placed at a supply location, a first data repository 530 having a first set of information that includes information that was sent with the object, and a second data repository 540 that includes a second set of information regarding the object that is determined by the system. The identification system 520 identifies an object using a number of different methods. For example, the object identification system 520 can read identifying indicia on the object, such as a barcode, object SKU, distinctive labeling, RFID tags, or any other method that recognizes an object. If an object is not recognized by the identification system 520, the object is diverted for processing by a human operator or a different system. Once the object is identified, object information from the first data repository 530 and second data repository 540 is evaluated by the object classification system 510.

The object classification system 510 uses the first and second sets of information to assign a specific class to the item. The first set of information includes information that is sent along with the object. This first set of information can include the identifying indicia used by the identification system 510, as well as a text description of the object, the product category of the object, manufacturer information, information regarding the dimensions, shape, mass, volume, materials used, packaging or item information including colors, patterns, images or other source indications, structural information such as deformability, fragility, required orientations ("This Side Up"), etc. A second set of information about the object can be determined by the system, for example using sensors to measure features such as mass, volume, dimensions, shape, stiffness, color, images, etc. It can also associate process variables to the object, such as effectors that can be used with the object, motion or inertial characteristics of the object that would affect processing, acceptable drop heights or orientations when releasing the object, or other time, temperature, or handling details.

Figure 29:
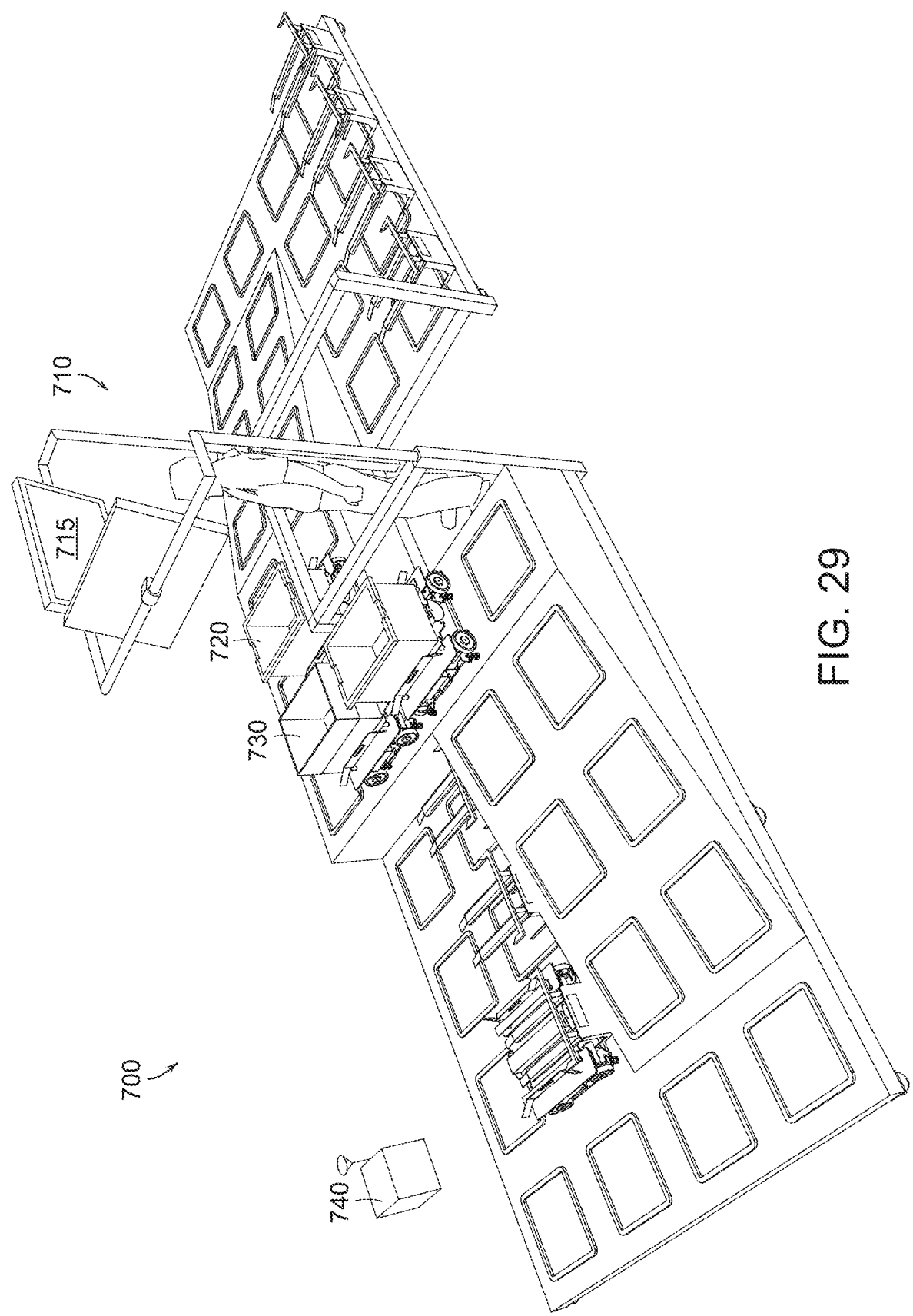
FIG. 29 shows an illustrative diagrammatic view of an object processing system in accordance with a further embodiment of the present invention.

The class information assigned by the classification system 510, in turn, defines processing parameters including the type and manner of processing that occurs at an object processing station 402. The type and manner of processing can include specific grasp-planning methods that can target, for example, placement on the object associated with the object's center of mass, or information related to flat areas on the object that can be grasped by a vacuum cup, or an indication that an explorative trial and error grasp methodology is required to find an appropriate grasp location. The processing parameters can also indicate various motion planning methodologies that balance the speed of the effector moving the object with the ability to maintain the object in the effector's grasp. The processing parameters may also include information related to releasing the object from the effector, including release height, release orientation, release location, etc. These processing parameters can indicate specific processing methods or hardware needs available at some but not all object processing stations 402. For example, a particularly heavy object may require a larger vacuum cup attached that is found at only a single object processing station. Alternatively, particularly fragile objects might be assigned to a specific person at a manual object processing station, and objects that require another skillset may go to a different person at a manual processing station. A manual pick station 700 is shown in FIG. 29, and includes a manual picking platform 710 where a person can process items from a source bin 720 into a destination bin 730. Any processing instructions can be displayed on interactive display 715, and any observations as to the success or failure of the processing parameters can be noted through the interactive display 715 and sent to the processing control center 740.

The processing control system 500 also includes a routing system 550 that routes an object from its supply location to a selected item processing station 402. The routing system 550 uses the class information provided by the object classification system 510 along with system information 556 to determine an optimal destination and route to the destination. The routing system 550 takes object processing station information, such as object queue, station hardware, station distance, and estimated travel time to the station to optimize routing. Routing information 555 is then sent to the system to be used.

As the object is sent to the object processing station and while it is being processed according to the determined processing parameters, evaluation information 575 is sent from system inputs 570 are used by the evaluation system 560 to evaluate the chosen class and routing information. The system inputs 570 can include inputs from sensors, such as depth sensors, 3d Cameras, RGB cameras, flow sensors, pressure sensors, positional or force sensors attached to the effector, weight sensors, microphones, or other feedback sensors to evaluate whether the interaction of the system with the object is successful or unsuccessful. System inputs can also be manually entered into the system by an operator witnessing the routing and object processing station interaction. For example, if an observing person sees that an object looks very securely held by an effector, and can likely be processed faster, the person can send that feedback through the system. A successful interaction can be one that occurred as expected and intended, within expected or desirable tolerances and thresholds, and without perceived damage. An unsuccessful interaction may be one that experienced failed grasping during initial engagement, failed grasping during transit, damage to the object, unintended collision of the effector or object with another object or structure, or interactions that exceeded expected or desirable tolerances and thresholds.

The successful or unsuccessful interactions can be quantified with a score that indicates how successful or unsuccessful an interaction was. This score can be based on sensory input, threshold proximity, target processing times versus actual processing times, routing times, object breakage, or other measurable information. The scores can then be used by the object classification system 510 to reclassify the object.

Whether the interactions are successful or unsuccessful, the processing parameters may be changed by the object classification system. For example, after a successful interaction, in an attempt to either increase speed or efficiency by trying different effectors, the object classification system may assign a different class to the object that allows for faster or riskier motion planning, less precise grasp planning, higher and less precise release characteristics can be implemented. After an unsuccessful interaction, a new class may be assigned that uses different processing parameters that are more likely to be successful.

As the system continues to process objects, the assigned class for the object will be assigned with greater likelihood of success. As new objects enter the system, the object classification system 510 can compare the new object's information with previously processed objects' information having comparable characteristics to choose a class for the new object with a higher chance of having a successful interaction at a chosen object processing station.

As an example, a substantial number of objects may be from a particular retailer that specializes in smart phone cases, and ships them all in packages that present particular challenges to the robotic picking stations. The packages are distinctively colored and easily recognizable, enabling the system to identify these items and handle them in a manner to assure a firm grip and a careful motion.

As another example, there is a great degree of standardization in paperboard envelopes, and in padded mailers. It is possible to classify an object from camera images, and infer its handling properties based on experience gained across the entire class. In this embodiment, the system is able to learn from experience based on recognizable patterns in package appearance, even in the absence of SKUs. The system is also able to use experience it gains with a single object. As an object makes its way through the network, it may pass through several shipping centers, and be sorted many times. When the barcode is acquired, and when the item is not making its first appearance in the system, the experience of previous handling is now available to select the correct process parameters.

In accordance with various embodiments, different use cases may be provided as follows. As an example involving introducing a new SKU in a distribution center, suppose that a cereal distributor has introduced a variation on the packaging of a popular breakfast cereal. The only change might be that a local sports hero appears on the box. When a bin with several of these items is introduced to the system, the system uses the barcode to get the SKU, and the associated product information. Based on this information, the system correctly classifies the product as a cereal box, identical in its handling properties with several cereal boxes already well known to the system. The system is immediately able to process the new SKU, based on its experience with similar products, and its ability to correctly recognize that similarity.

As described above, the classification process occurs autonomously without human participation. Alternatively, this classification process might be performed when a human worker presents the new SKU to the system, giving the human an opportunity to confirm or correct the classification.

In another example involving re-classifying an item based on a data obtained during processing, a new SKU may have been introduced and classified as a cereal box, as described above. However, due to new packaging of the SKU, the dimensions have changed, and must be grasped using a small cup size. Because the system has never seen that SKU before, it will use the process parameters of the previous SKU. After the first unsuccessful pick of the SKU, the system will update its estimated parameters away from its original prior.

At the same time, this change in the classification structure can be applied to other objects that have been introduced to the system, but have not yet been routed to picking stations with cameras. So, when a distributor introduces new packaging for an entire line of products, the system might not have to look at each item, but can make reasonable inferences just from examining the first such item.

In another example involving learning to avoid placing a suction cup on a seam, there are several SKUs, shampoo bottles in several varieties corresponding to dry hair, oily hair, fresh scent, herbal, and so on. All of them are packaged in the same type of bottle. As these shampoos are processed, occasionally the suction gripper is placed at the seam between lid and bottle, which is virtually invisible to the system's perception system. When these grips fail, the system can determine this from imagery of the destination bin, from pressure sensing in the effector, from a force/torque sensor in the wrist, or a combination of these sensors. The system notes the location of the failed grasp, and adjusts downward the expectation of a good grasp in the vicinity. Thus the system learns better grasp behaviors, for all items in the class, and it does so quickly since it can aggregate experience gained across the entire class.

In another example involving learning a better motion, several SKUs may be packaged similarly as bottles enclosed in paperboard boxes. Often the boxes arrive at a picking station standing side by side in the bin, and must be grasped by a suction cup placed on the top of the box, which is a hinged lid. The robot obtains a secure grasp, and lifts the box clear of the other boxes in the bin. Then the robot begins a motion to transport the box to the destination bin. Depending on that trajectory, including the acceleration, the tipping of the effector, and the orientation of the box, the lid sometimes comes open. The system detects this event from imagery and force/torque data. The system adjusts the motion to a more conservative motion, keeping the center of mass centered under the suction cup, by maintaining a more upright angle of the effector.

In another example involving learning to avoid damage, suppose a new SKU is introduced, but on occasion, perhaps one time in five, the product is damaged when it is dropped into a destination bin. The violence of the drop might be exacerbated by the oscillation of the heavy item suspended from the bellows cup. In this case, the outcome might not be observable to the system's sensors, but might be observed and reported by human workers as input to the system. The system modifies the dropping action, moving the effector closer to the destination bin, and timing the release so that the object's oscillation is at its nadir.

In a further example involving learning to use a new effector, a certain class of items may be usually handled well, but perhaps some of the items are heavier than average. The system has learned to handle them without dropping by moving more slowly, but this results in lower productivity. The engineering team introduces an additional robotic picking station with a larger suction cup. As items are routed to the new station, a variety of items and motions are employed, and based on observed outcomes the system learns which items are suited to the new effector, and which motions are acceptable. In the end, the heavier items are now handled quickly and productivity is restored. In addition, when a new effector is introduced, its characteristics might be manually entered, to speed up the process by which the system integrates the new effector in operations.

In a further example involving learning to recognize outcomes, a variety of sensors may be used to detect success or failure, and type of failure. These include pressure sensors, force/torque sensors, and image sensors. There are software procedures to process these sensor signals to recognize the outcome. These software procedures can be refined by using the information obtained by one sensor to improve another sensor, or by using the outcome determined by a fusion of the sensors. As a simple example, imagine that failure is being signaled by a change in sensed pressure, but after several examples it becomes evident from other data that the pressure sensor is signaling the failure a bit late. The signal processing, a feature or set of features, or a threshold, might be adjusted to advance the detection of failure by the pressure sensor.

In a further example involving learning to detect anomalies, trash may sometimes enter a vacuum gripper, and lodge against a screen, reducing the effector's effectiveness. Anomaly detection software might note when sensory signals stray outside of a given region. When the source of an anomaly is identified, such as when human operators note that trash has entered a vacuum gripper, the anomaly detection software may then adjust itself to correctly classify future such anomalies, and alert human operators in a more timely fashion.

In a further example involving learning to interpret force/torque sensors, the force/torque sensor picks up signals from a variety of sources. The vacuum supply hose moves around, and its motion varies with robot motion and with hose pressure. The item moves around, and sometimes the contents are lose and move around within the item. There are time constants and other characteristics associated with these signals, which presents an opportunity to put signal processing into place that is tuned for the particular item, and to reject the noise.

Those skilled in the art will appreciate that numerous modifications and variations may be made to the above disclosed embodiments without departing from the spirit and scope of the present invention.

What is claimed is:

1. An object processing system comprising:
a first non-transitory computer memory system for storing plural sets of classification data regarding a plurality of known objects, each set of classification data including classification specific data for the plurality of known objects, each set of classification data being associated with a set of classification level object processing parameters;
a perception system for receiving perception data regarding a selected unknown object and for generating perceived input information for the selected unknown object;
a second non-transitory computer memory system for receiving the perceived input information for the selected unknown object;
a classification system in communication with the first non-transitory computer memory system and the second non-transitory computer memory system for assigning to the selected unknown object, where the perceived input information generated by the perception system includes no perceived identifying indicia for identifying the selected unknown object, an object classification associated with one of the plural sets of classification data that closely matches the perceived input information; and a programmable motion device with an end-effector for grasping and moving the selected unknown object to a routing system in accordance with a set of classification level object processing parameters associated with the assigned object classification.

2. The object processing system as claimed in claim 1, wherein the classification specific data for the plurality of known objects includes any of text description, product category, manufacturer information, dimensions, shape, mass, volume, packaging materials, packaging colors, packaging patterns, packaging images, deformability, fragility, and orientation requirements.

3. The object processing system as claimed in claim 2, wherein the classification specific data for the plurality of known objects further includes identifying indicia associated with each of the plurality of known objects.

4. The object processing system as claimed in claim 1, wherein the classification level object processing parameters includes any of grasp locations, gripper type, vacuum pressure, vacuum flow, motion planning, motion speed, discharge speed and discharge height.

5. The object processing system as claimed in claim 1, wherein the perceived input information includes any of perceived text, perceived manufacturer information, perceived dimensions, perceived shape, perceived mass, perceived volume, perceived packaging materials, perceived packaging colors, perceived packaging patterns, perceived packaging images, perceived deformability, perceived fragility, and perceived orientation requirements.

6. The object processing system as claimed in claim 1, wherein the object processing system further includes an evaluation system for evaluating an interaction of the selected unknown object and the programmable motion device according to the set of classification level object processing parameters of the assigned object classification, wherein the evaluation system determines whether the interaction is successful or unsuccessful.

7. The object processing system as claimed in claim 6 wherein the interaction evaluated by the evaluation system includes any of object grasping failure, object transit failure, and object placement failure and object damage.

8. The object processing system as claimed in claim 6, wherein the evaluation system receives sensor input provided by one or more of depth sensors, scanners, cameras, flow sensors, pressure sensors, position sensors, force sensors, scales, acceleration sensors, and vibration sensors.

9. The object processing system as claimed in claim 6, wherein the evaluation system receives human input to evaluate the interaction of the selected unknown object and the programmable motion device.

10. The object processing system as claimed in claim 6 wherein the classification level object processing parameters are updated in response to the determination of the evaluation system.

11. The object processing system as claimed in claim 1, wherein the perception system includes cameras and uses edge detection analyses on camera images.

12. The object processing system as claimed in claim 1, wherein the perception system includes volumetric 3D scanners, and wherein the perception system identifies an end-effector volume with the volumetric 3D scanners that is separated from a volume of the selected unknown object.

13. The object processing system as claimed in claim 1, wherein the routing system includes a carrier that receives the selected unknown object from the programmable motion device and brings the selected unknown object to a destination location.

14. The object processing system as claimed in claim 13, wherein the carrier includes load cells for determining a weight of the selected unknown object.

15. The object processing system as claimed in claim 13, wherein the destination location is provided among an array of destination locations.

16. An object processing system comprising:
a non-transitory computer memory system for storing plural sets of classification data regarding a plurality of known objects, each set of classification data including classification specific data for the plurality of known objects, each set of classification data being associated with set of classification level object processing parameters;
a perception system for receiving perception data regarding a selected unknown object and for generating perceived input information for the selected unknown object including any of perceived text, perceived manufacturer information, perceived dimensions, perceived shape, perceived mass, perceived volume, perceived packaging materials, perceived packaging colors, perceived packaging patterns, perceived packaging images, perceived deformability, perceived fragility, and perceived orientation requirements;
a classification system in communication with the non-transitory computer memory system for assigning to the selected unknown object, responsive to the perceived input information, an object classification associated with one of the plural sets of classification data that closely matches the perceived input information; and
a programmable motion device with an end-effector for grasping and moving the selected unknown object to a routing system in accordance with a set of classification level object processing parameters associated with the assigned object classification.

17. The object processing system as claimed in claim 16, wherein the classification specific data for the plurality of known objects includes any of text description, product category, manufacturer information, dimensions, shape, mass, volume, packaging materials, packaging colors, packaging patterns, packaging images, deformability, fragility, and orientation requirements.

18. The object processing system as claimed in claim 17, wherein the classification specific data for the plurality of known objects further includes identifying indicia associated with each of the plurality of known objects.

19. The object processing system as claimed in claim 16, wherein the classification level object processing parameters includes any of grasp locations, gripper type, vacuum pressure, vacuum flow, motion planning, motion speed, discharge speed and discharge height.

20. The object processing system as claimed in claim 16, wherein the object processing system further includes an evaluation system for evaluating an interaction of the selected unknown object and the programmable motion device according to the set of classification level object processing parameters of the assigned object classification, wherein the evaluation system determines whether the interaction is successful or unsuccessful.

21. The object processing system as claimed in claim 20 wherein the interaction evaluated by the evaluation system includes any of object grasping failure, object transit failure, and object placement failure and object damage.

22. The object processing system as claimed in claim 20, wherein the evaluation system receives sensor input provided by one or more of depth sensors, scanners, cameras, flow sensors, pressure sensors, position sensors, force sensors, scales, acceleration sensors, and vibration sensors.

23. The object processing system as claimed in claim 20, wherein the evaluation system receives human input to evaluate the interaction of the selected object and the programmable motion device.

24. The object processing system as claimed in claim 20 wherein the classification level object processing parameters are updated in response to the determination of the evaluation system.

25. The object processing system as claimed in claim 16, wherein the perception system includes cameras and uses edge detection analyses on camera images.

26. The object processing system as claimed in claim 16, wherein the perception system includes volumetric 3D scanners, and wherein the perception system identifies an end-effector volume with the volumetric 3D scanners that is separated from a volume of the selected unknown object.

27. The object processing system as claimed in claim 16, wherein the routing system includes a carrier that receives the selected unknown object from the programmable motion device and brings the selected unknown object to a destination location.

28. The object processing system as claimed in claim 27, wherein the carrier includes load cells for determining a weight of the selected unknown object.

29. The object processing system as claimed in claim 27, wherein the destination location is provided among an array of destination locations.

30. A method of processing objects in an object processing system, said method comprising:
    storing plural sets of classification data regarding a plurality of known objects in a first non-transitory computer memory system, each set of classification data including classification specific data for the plurality of known objects, each set of classification data being associated with a set of classification level object processing parameters;
    receiving perception data regarding a selected unknown object and generating perceived input information for the selected unknown object;
    storing the perceived input information for the selected unknown object in a second non-transitory computer memory system;
    determining that the perceived input information includes no perceived identifying indicia;
    assigning to the selected unknown object, responsive to the perceived input information and the plural sets of classification data, an object classification based on the classification level object processing parameters associated with associated with one of the plural sets of classification data that closely matches the perceived input information responsive to determining that the perceived input information includes no perceived identifying indicia;
    grasping the selected unknown object with an end-effector of a programmable motion device in accordance with a set of classification level object processing parameters associated with the assigned object classification; and
    moving the selected unknown object to a routing system in accordance with the set of classification level object processing parameters associated with the assigned object classification.

31. The method as claimed in claim 30, wherein the classification specific data for the plurality of known objects includes any of text description, product category, manufacturer information, dimensions, shape, mass, volume, packaging materials, packaging colors, packaging patterns, packaging images, deformability, fragility, and orientation requirements.

32. The method as claimed in claim 30, wherein the set of classification level object processing parameters includes any of grasp locations, gripper type, vacuum pressure, vacuum flow, motion planning, motion speed, discharge speed and discharge height.

33. The method as claimed in claim 30, wherein the perceived input information includes any of perceived text, perceived manufacturer information, perceived dimensions, perceived shape, perceived mass, perceived volume, perceived packaging materials, perceived packaging colors, perceived packaging patterns, perceived packaging images, perceived deformability, perceived fragility, and perceived orientation requirements.

34. The method as claimed in claim 30, wherein the method further includes evaluating an interaction of the selected unknown object and the programmable motion device according to the set of classification level object processing parameters of the assigned object classification, and determining whether the interaction is successful or unsuccessful.

35. The method as claimed in claim 34 wherein the interaction evaluated includes any of object grasping failure, object transit failure, and object placement failure and object damage.

36. The method as claimed in claim 30, wherein the method further includes receiving the selected unknown object in a carrier and bringing the selected unknown object to a destination location.

37. The method as claimed in claim 36, wherein the method further includes determining a weight of the selected unknown object in the carrier.

38. The method as claimed in claim 36, wherein the destination location is provided among an array of destination locations.

* * * * *

UNITED STATES PATENT AND TRADEMARK OFFICE
CERTIFICATE OF CORRECTION

PATENT NO. : 12,157,634 B2
APPLICATION NO. : 17/836271
DATED : December 3, 2024
INVENTOR(S) : Thomas Wagner et al.

Page 1 of 1

It is certified that error appears in the above-identified patent and that said Letters Patent is hereby corrected as shown below:

In the Specification

In Column 3, Line 29, should read:
"a pair of a perception unit and illumination"

Signed and Sealed this
Twenty-second Day of July, 2025

Coke Morgan Stewart
*Acting Director of the United States Patent and Trademark Office*